(12) United States Patent
Bernini et al.

(10) Patent No.: US 8,195,171 B2
(45) Date of Patent: Jun. 5, 2012

(54) METHOD FOR ESTIMATING A RADIO COVERAGE OF A GEOGRAPHIC AREA IN A CELLULAR MOBILE RADIO COMMUNICATION NETWORK

(75) Inventors: Antonio Bernini, Turin (IT); Paola Bertotto, Turin (IT); Stefano Macagno, Turin (IT); Guglielmo Tomaselli, Turin (IT)

(73) Assignee: Telecom Italia S.p.A., Milan (IT)

( * ) Notice: Subject to any disclaimer, the term of this patent is extended or adjusted under 35 U.S.C. 154(b) by 1014 days.

(21) Appl. No.: 12/086,868

(22) PCT Filed: Dec. 21, 2005

(86) PCT No.: PCT/EP2005/013746
§ 371 (c)(1),
(2), (4) Date: Jun. 20, 2008

(87) PCT Pub. No.: WO2007/071271
PCT Pub. Date: Jun. 28, 2007

(65) Prior Publication Data
US 2010/0178925 A1      Jul. 15, 2010

(51) Int. Cl.
*H04W 40/00* (2009.01)
(52) U.S. Cl. ..................................................... 455/446
(58) Field of Classification Search ........... 455/446–449
See application file for complete search history.

(56) References Cited

U.S. PATENT DOCUMENTS

| 6,097,959 | A | 8/2000 | Yost et al. |
| 6,876,856 | B2* | 4/2005 | Fattouch ...................... 455/446 |
| 2003/0040318 | A1 | 2/2003 | Fattouch |
| 2004/0116124 | A1 | 6/2004 | Lepschy et al. |

FOREIGN PATENT DOCUMENTS

| EP | 1 283 644 A1 | 2/2003 |
| GB | 2 269 298 A | 2/1994 |
| WO | WO 02/080602 A1 | 10/2002 |
| WO | WO 2005/076645 A1 | 8/2005 |
| WO | WO 2005/076646 A1 | 8/2005 |

* cited by examiner

*Primary Examiner* — George Eng
*Assistant Examiner* — Nam Huynh
(74) *Attorney, Agent, or Firm* — Finnegan, Henderson, Farabow, Garrett & Dunner, L.L.P.

(57) ABSTRACT

A method, and a related system, for estimating coverage of a selected geographic area by a cellular radio mobile communications network including a plurality of radio base stations, includes: dividing the selected area into a plurality of area elements and determining expected serving radio base stations expected to serve the area elements based on an estimation of the strength of the radio electromagnetic field of the radio base stations in the area element. The expected serving radio stations are determined by: estimating probabilistic distributions of the strength of the radio electromagnetic fields irradiated by the radio base stations and perceived in the area element; and calculating probabilities that the area elements are served by the radio base stations based on said probabilistic distributions. The method can be exploited in the planning of a network, for example, in the estimation of the distribution of traffic.

6 Claims, 10 Drawing Sheets

METHOD FOR ESTIMATING A RADIO COVERAGE OF A GEOGRAPHIC AREA IN A CELLULAR MOBILE RADIO COMMUNICATION NETWORK

CROSS REFERENCE TO RELATED APPLICATION

This application is a national phase application based on PCT/EP2005/013746, filed Dec. 21, 2005, the content of which is incorporated herein by reference.

BACKGROUND OF THE INVENTION

1. Field of the Invention

The present invention generally relates to the field of radio communications networks planning, particularly to the planning of cellular mobile radio communications networks like for example GSM (Global System for Mobile communications) networks and UMTS (Universal Mobile Telecommunications System) networks.

2. Description of the Related Art

As known, a cellular mobile radio communications network includes a plurality of antennas or radio base stations, each one providing radio communications coverage in a respective geographic area, referred to as a cell.

Deploying a cellular mobile radio communications network includes planning the location, the configuration and the radio communications resources (e.g., GSM radio carriers) to be allocated to the different radio base stations.

An aim of the network designers is to ensure that the network being planned provides good coverage of an area of interest. Another aim is to ensure that each radio base station has sufficient radio resources to serve all the traffic that is expected to be generated by the users' mobile communications terminals located in the respective cell (so as for example to minimize blocked calls and dropped calls), without however wasting precious radio resources.

Thus, an aspect of the network planning concerns the estimation of the radio electric coverage of a geographic area of interest by the radio base stations. In this phase, according to the prior art, the area of interest is subdivided into relatively small elementary areas, also referred to as "pixels", and, using suitable simulation algorithms (such as for example those described in the International published applications WO 2005/076645 and WO 2005/076646, both in the name of the present Applicant), the distribution of the electromagnetic field irradiated by the different radio base stations is calculated; then, best server maps are determined, which provide, for each radio base station, an indication of the area (set of pixels) wherein that radio base station is expected to best serve mobile communications terminals located therein.

The radio electric coverage is for example exploited in other phases of the planning process, such as in the estimation of the distribution of the network traffic in the geographic area intended to be covered by the network under planning (which may be a new area of coverage of a mobile cellular radio communications network, or an already deployed network area, which needs to be updated). A correct forecast of the traffic distribution is indeed essential for a proper dimensioning of the radio resources of the different cells of a network area to be planned, and thus to the capability of satisfying the requests by the users, thereby providing a highly satisfactory service thereto.

As described for example in U.S. Pat. No. 6,097,959, conventional radiotelephone service planning systems and methods generate the best server images based primarily on estimated pathloss, i.e. using signal strength levels at specific locations.

In other words, the generic pixel of the area of interest is assigned to a certain radio base station based which, compared to the other radio base stations, produces the highest signal strength level on that pixel.

SUMMARY OF THE INVENTION

The Applicant has observed that the way the best server areas are defined is critical for the accuracy and usefulness of the results of the network planning procedure.

In particular, the Applicant has found that the conventional way of calculating the best server areas is based on an oversimplification, and is too rigid in assigning a generic pixel to one radio base station. This is especially risky in the case of densely urbanized areas: these areas usually feature a relatively high number of radio base stations, and the best server area of the generic radio base station is typically limited to a relatively small number of pixels; assigning a pixel to the wrong best server cell, and/or missing to assign to a best server cell one or more pixels that, in the real network operation, will play an important role, may lead to non-negligible errors that affect the whole planning process; for example, the distribution of the traffic to the various pixels would be erroneous.

The Applicant has found that since the conventional approach for assigning the pixels to the serving cells is based on a simple comparison of the average field levels on the pixels as estimated by the simulator, undesirable results are produced. For example, considering two cells producing equal average field levels on a certain pixel, that pixel is assigned to the best server area of the cell which, in the cell scanning sequence, is considered first; thus, changing the order in which the cells are scanned may change the resulting best server maps.

Also, pixels in which the average field level calculated by the simulator is below the sensitivity of the terminals are discarded, and not considered for example in the following distribution of traffic: in the real operation, it may instead happen that the statistical fluctuations in the electromagnetic field cause the field level on that pixel to be sufficient for accessing the network, so that pixel will provide a traffic contribution not expected in the planning phase.

The Applicant has tackled the problem of overcoming the drawbacks evidenced by the known network planning methods, particularly of improving the definition of the server areas for the different radio base stations of a network, in a way that is more accurate and close-to-reality.

Essentially, the Applicant has found that a far better way to define the cell server areas is to follow a probabilistic approach, instead of the conventional, deterministic approach. In other words, instead of assigning a pixel to a single radio base station, two or more radio base stations are associated to the pixel as potential serving station, each radio base station being characterized by a respective degree of probability of being the serving radio base station of that pixel.

According to an aspect of the present invention, a method for estimating a radio coverage of a geographic area by a cellular radio communications network is provided, comprising:

dividing the selected area into a plurality of area elements;

determining expected serving radio base stations of the network expected to serve the area elements, based on an estimation of the strength of the radio electromagnetic field of the radio base stations in the area elements, characterized in that
said determining expected serving radio station includes:
estimating, for each radio base station, a respective probabilistic distribution of the strength of the radio electromagnetic fields irradiated by the radio base station and perceived in each area element of said plurality of area elements; and
calculating, for each radio base station and for each area element of said plurality of area elements, respective probabilities that the radio base station serves said plurality of area elements, based on said estimated probabilistic distributions.

The method according to the first aspect of the invention can expediently be used in a method for estimating a distribution of network traffic. In brief, the method includes:

determining a radio base station traffic in respect of each radio base station of the network;

calculating a traffic contribution to the radio base station traffic by the area elements of a selected network area, wherein said calculating the traffic contribution further comprises:

calculating, for each of said area elements, a respective network traffic generation propension, wherein said network traffic generation propension is adapted to provide an indication of a forecasted population of users of the network in respect of the traffic generating area element;

determining a radio coverage of each area element by said plurality of radio base stations; and determining the traffic contribution by each area element based on the respective network traffic generation propension and on the radio coverage by the radio base stations.

Said radio coverage is determined by:
estimating, for each radio base station of said plurality of radio base stations, a respective probabilistic distributions of the strength of the radio electromagnetic fields irradiated by the radio base station and perceived in each area element of said plurality of area elements; and
calculating, for each radio base station of said plurality of radio base stations and for each area element of said plurality of area elements, respective probabilities that the radio base station serves said plurality of area elements, based on said estimated probabilistic distributions.

Other aspects of the present invention concerns data processing systems, comprising means adapted to implement the steps of the methods according to the first or second aspects of the invention, and computer programs, comprising instructions for carrying the steps of the method according to the first or second aspects of the invention.

BRIEF DESCRIPTION OF THE DRAWINGS

The features and advantages of the present invention will be made apparent by the following detailed description of some embodiments thereof, provided merely by way of non-limitative examples, description that will be carried out making reference to the attached drawings, wherein.

DETAILED DESCRIPTION OF THE PREFERRED EMBODIMENT(S)

Figure 1:
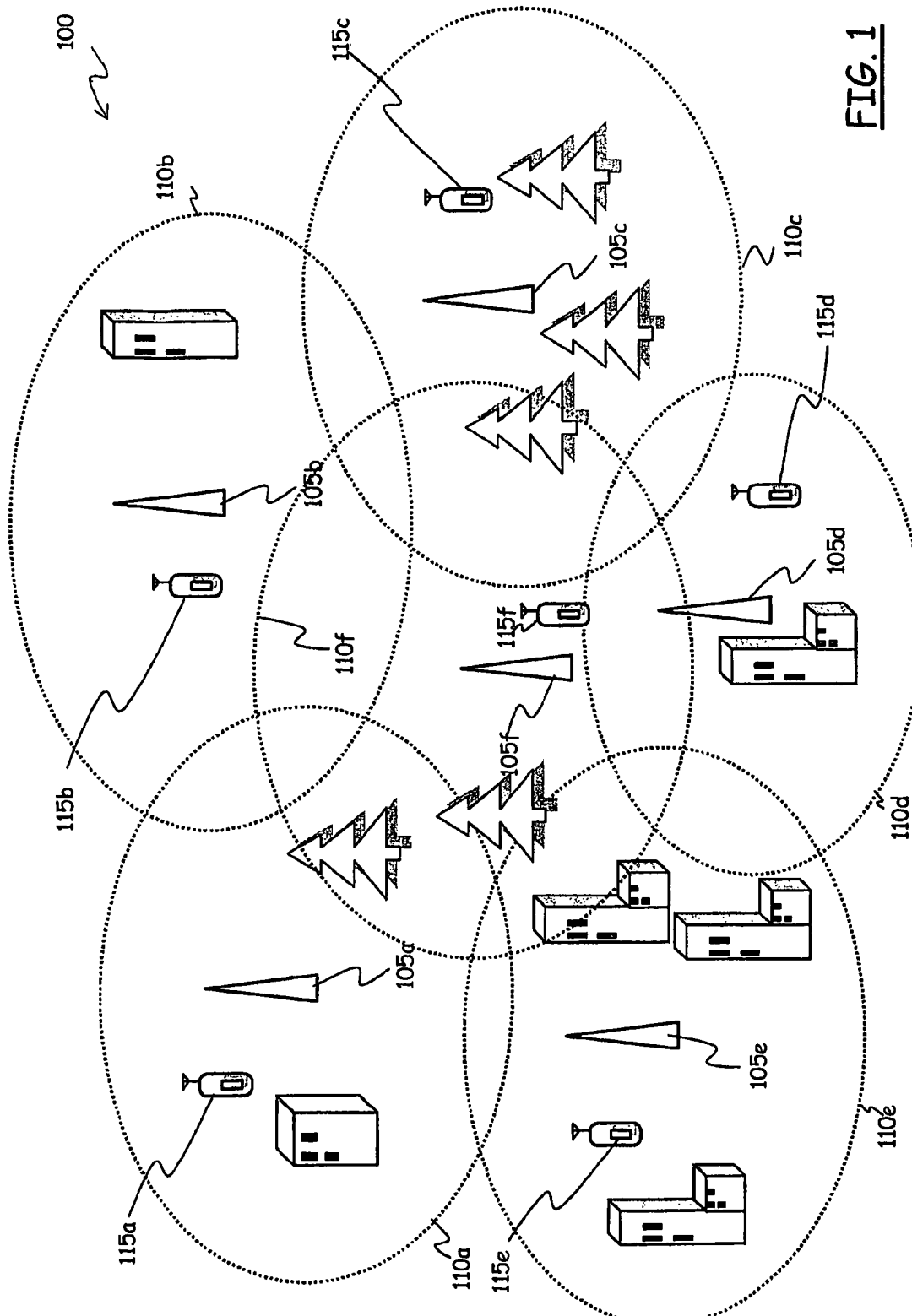
FIG. 1 pictorially shows a portion of a geographic area covered by a cellular mobile radio communications network.

Making reference to FIG. 1, there is schematically shown a geographic area 100 covered by a cellular mobile radio communications network, for example an area of the network under planning. For example, the network may be a GSM network, or a UMTS network, or equivalent/counterpart standards.

Reference numerals 105a to 105f identify five antennas, i.e. five radio base stations of the cellular network (e.g., Base Transceiver Stations—BTSs, in the case of a GSM network, Node-Bs in the case of a UMTS network), corresponding to five network cells. In the drawing, dotted lines are used to pictorially show the areas 110a to 110f of radio coverage of the radio base stations 105a to 105f, i.e. those areas wherein the signal irradiated by the respective radio base station is perceived. It can be appreciated that the areas of radio coverage of the radio base stations 105a to 105f at least partially overlaps, meaning that, as it normally is, a certain geographical location may be reached by the signal of two or more radio base stations.

A level of urbanization of the territory generally varies both from cell to cell, and also within a cell: for example, the cell corresponding to the radio base station 105e may be located in a relatively high-density urban area, the cell corresponding to the radio base station 105d may be located in a medium-density urban area, the cells corresponding to the radio base stations 105a, 105b and 105d may be located in low-density urban areas, whereas the cells 105c and 105f are for example located in rural areas. This has an impact on the propagation and on how the signal irradiated by a radio base station is perceived by mobile communications terminals, like those schematically depicted and identified by reference numerals 115a to 115f, which are for example cellular phones, located in the respective cells and capable of accessing the network, thereby generating network traffic.

As mentioned in the foregoing, a phase of the network planning process concerns the estimation of the radio electric coverage of the area of interest by the radio base stations.

In particular, the estimation of the radio electric coverage is useful to the network designer for assessing the degree of coverage of the area of interest by the network signal, and also to plan a proper location, configuration and radio resource dimensioning (e.g., number of radio carriers to be allocated) in respect of the different radio base stations 105a to 105f adapted to ensure that the network being planned is able to serve the desired traffic.

In the following, a method according to an embodiment of the present invention for estimating the radio electric coverage is described in connection with a method for forecasting the traffic that the network area 100 under planning will have to sustain. However, it is pointed out that the radio electric coverage estimation method of the present invention is not limited to be exploited in the carried traffic forecast, being applicable more in general to other phases of the network planning process.

Figure 2:
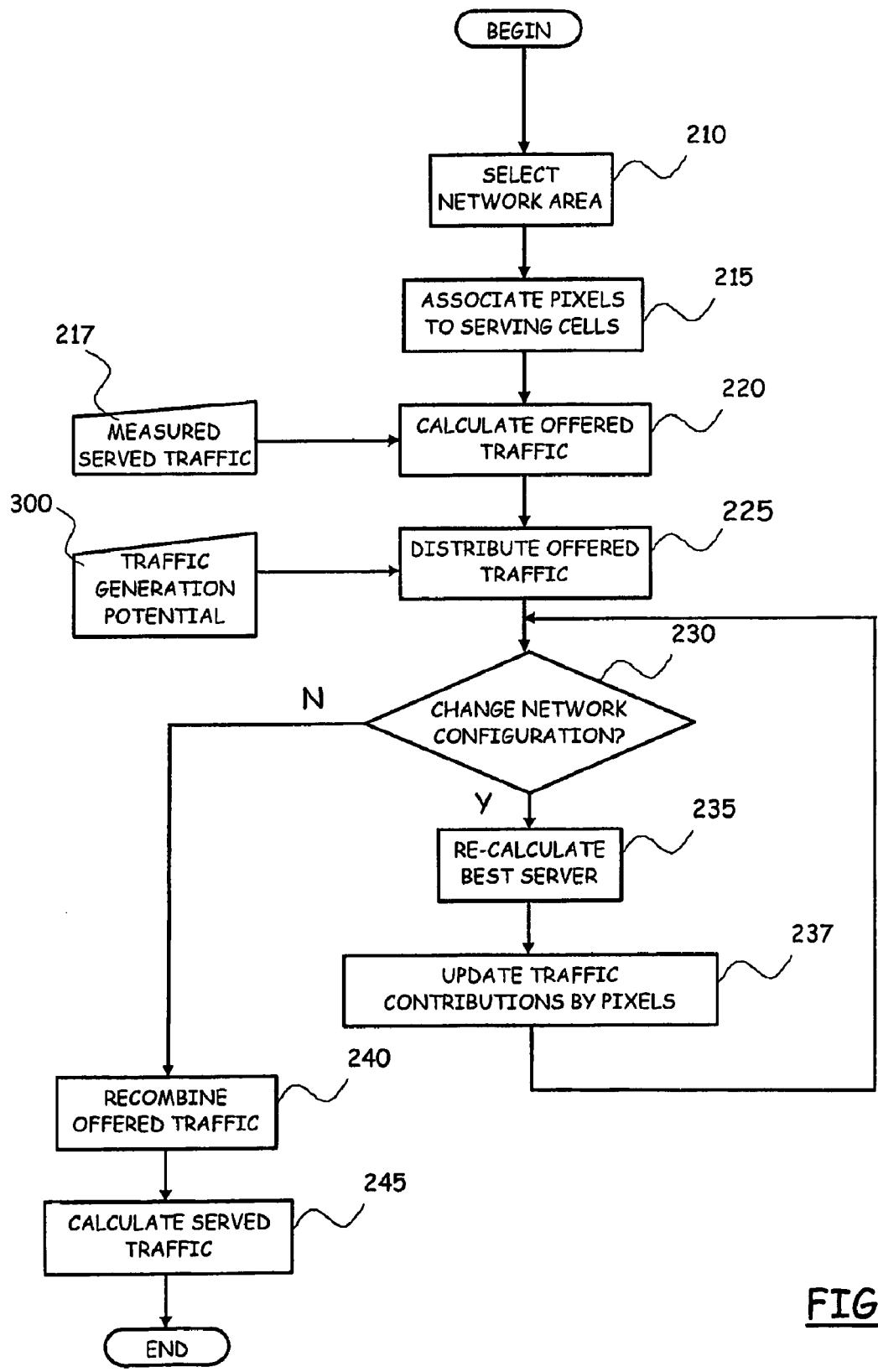
FIG. 2 is a schematic, simplified flowchart of a procedure for planning a dimensioning of the cellular mobile radio communications network, in an embodiment of the present invention.

The schematic flowchart of FIG. 2 illustrates the main steps of a procedure for forecasting the traffic in the area 100.

Firstly, the geographic area of interest 100 is selected (block 210). As mentioned in the foregoing, this can for example be an area of new coverage of a cellular mobile radio communications network, or an already covered area in which the mobile radio communications network needs to be upgraded (e.g., in terms of radio communications resources installed in the various radio base stations).

Figure 3:
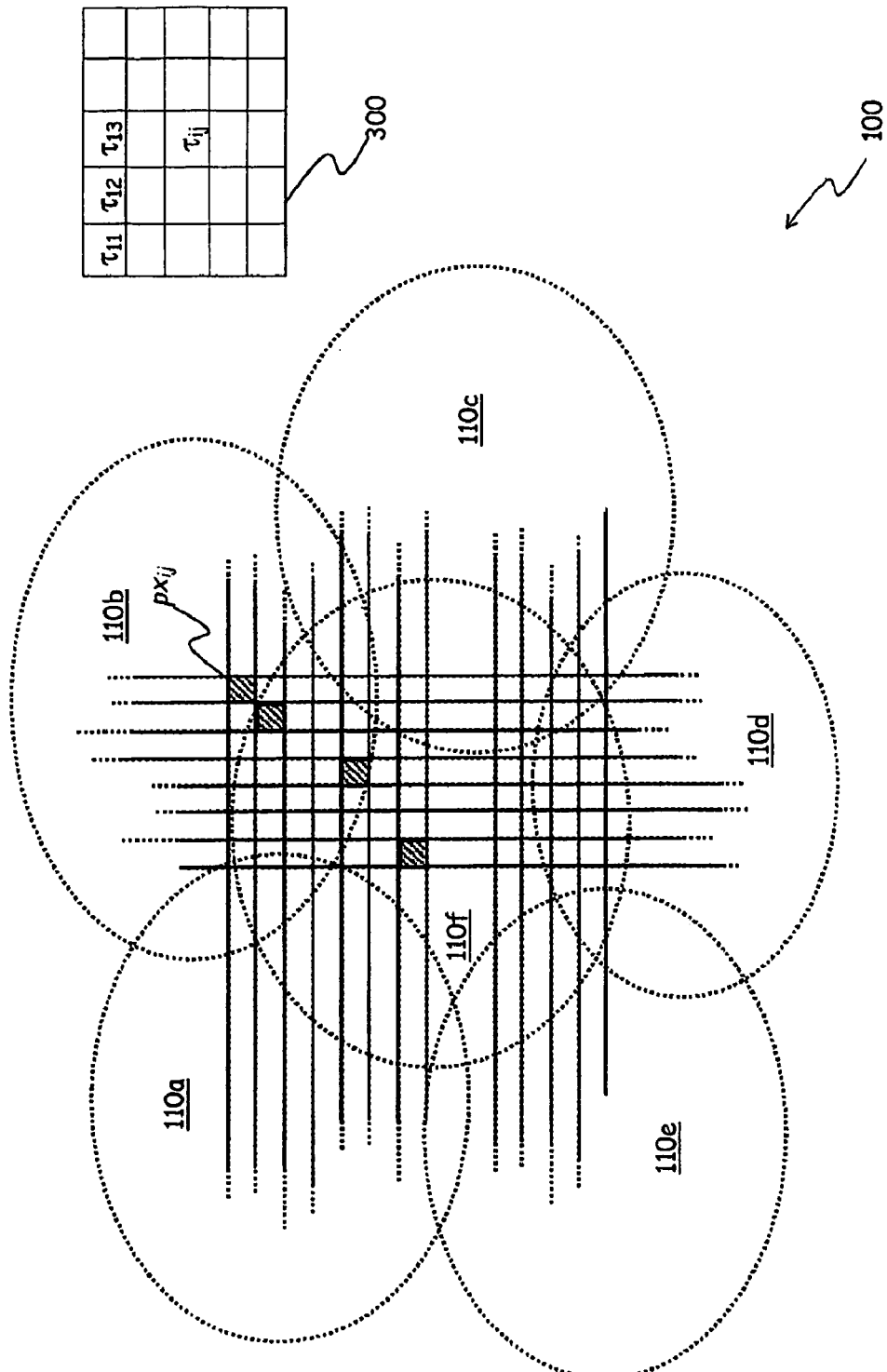
FIG. 3 schematically shows a subdivision into elementary areas elements, or pixels, of the portion of geographic area covered by a cellular mobile radio communications network.

As schematically depicted in FIG. 3, the geographic area of interest is ideally subdivided into relatively small, elementary area elements or pixels $px_{ij}$ (where i and j are two indexes which take integer values to span the area of interest) each pixel being an elementary, unit (in the shown example, square) area of predefined width, e.g. a 50 m by 50 m square.

For the purpose of subsequently distributing traffic, the pixels are then assigned to cells of the area under planning that are expected to serve the pixels (block 215).

Taken the generic cell, the level of the electromagnetic field produced by the respective radio base station on the generic pixel $px_{ij}$ is calculated, using per-se known electromagnetic wave propagation simulators. Suitable cell coverage simulation algorithms for simulating the distribution of the electromagnetic field are for example described in the already-cited International published applications WO 2005/076645 and WO 2005/076646, in the name of the present Applicant. In particular, in order to calculate the distribution of the electromagnetic field, the simulation algorithms exploit data defining the location and the configuration (radio equipment) of the radio base stations 105a to 105f, and data indicative of the characteristics of the territory of the area of interest 100 (i.e., characteristics like the territory morphology, orographic characteristics, presence of buildings, of roads, of railways, and the like). Then, for the generic pixel it is ascertained that the electromagnetic field level at that pixel exceeds a minimum threshold, being the sensitivity of the mobile terminals.

Conventionally, as discussed in the introductory part of the present description, in this phase best-server areas 110a to 110f of the different radio base stations 105a to 105f are calculated, for the cells belonging to the area 100 under consideration, by associating each pixel $px_{ij}$ to a respective serving radio base station which, based on considerations regarding the electromagnetic field level strength, is expected to serve that pixel: the electromagnetic field levels produced on that pixel by all the radio base stations that passed the minimum threshold test are compared, and the pixel is assigned to the best-server area of that radio base station which produces the strongest electromagnetic field on that pixel. In case of a cellular mobile radio communications network having two or more different radio access layers, like the GSM 900 MHz and the GSM 1800 MHz access layers, the procedure described above is repeated for every radio access layer. Thus, a map of best-server areas is obtained in respect of each radio access layer, wherein for the generic pixel of the area under planning the best server cell and the respective electromagnetic field level (the "best field") are stored. In case the two or more radio access layers are arranged according to a hierarchy, having different priorities, a further procedure is performed, which, starting from the highest access layer in the hierarchy, discards from the best-server area of the generic cell those pixels at which the electromagnetic field level falls below a hierarchic threshold of the cell, provided that the considered pixel is covered by a cell corresponding to a lower hierarchic layer and that the field at the pixel exceeds the hierarchic threshold of the lower hierarchic layer.

At the end of the procedure, for each cell of the area under planning a best server coverage map is determined, wherein the pixels belonging to a best server map are expected to be served by the radio base station that corresponds to that best server map.

The best server coverage maps are exploited in the following part of the planning procedure for distributing the traffic of the cells.

In particular, an offered traffic is calculated, on a network cell basis (block 220), starting for example from data 217 of carried traffic, obtained by measuring the traffic carried by the network for a given, existing configuration and radio resource dimensioning of the radio base stations 105a to 105f. In order to calculate the offered traffic from the measured carried traffic, suitable methods and algorithms are exploited, which are adapted to calculate the offered traffic based on the radio resource dimensioning of the radio base stations 105a to 105f; a suitable method for calculating the offered traffic on a network cell basis exploits for example a method described in the International published application WO 02/080602, in the name of the present Applicant; in particular, the method described in that patent application accepts as an input the offered traffic and a number of channels of a generic cell, and gives as a result an estimation of the cell's performance in terms of carried traffic and losses. In the present case, the carried traffic is assumed to be known, being the result of measures: the corresponding offered traffic can be estimated using iteratively the method described in WO 02/080602. Firstly, a starting offered traffic is taken, and, applying the method described in WO 02/080602, the corresponding carried traffic is calculated; the calculated carried traffic is compared to the measured carried traffic, and, if they differ of less than a predefined minimum amount (e.g., 0.1 Erlang), the starting assumption on the offered traffic is taken as the offered traffic that corresponds to the measured carried traffic. If instead the difference exceeds the predefined minimum amount, the offered traffic is varied, e.g. increased of an amount corresponding to the difference between the previously calculated carried traffic and the measured carried traffic, and the new carried traffic is calculated, applying the method described in WO 02/080602. The procedure is iterated until the calculated carried traffic differs from the measured carried traffic of less than the predetermined minimum quantity.

The offered traffic thus calculated is then distributed across the different pixels of the area of interest 100 (block 225), so as to obtain, for each pixel, a respective value of offered traffic, indicative of the traffic that will be offered to the network by that pixel. In the distribution of the offered traffic across the pixels, account is taken of respective traffic generation propensions thereof. In particular, a matrix 300 of traffic generation propension is calculated, wherein, for the generic pixel $px_{ij}$ of the area 100 of interest, a respective traffic generation propension $\tau_{ij}$ is calculated; the traffic generation propension $\tau_{ij}$ of a generic pixel $px_{ij}$ is a number indicating a propension of that pixel $px_{ij}$ to generate traffic, providing an indication of a forecasted population of users of the network services (i.e., traffic-generating users) that will be present on that pixel. Thus, the matrix of traffic generation propensions provides an indication, at the level of the pixels, of the distribution across the area under planning of a forecasted population of users of the network services.

The distribution of the network offered traffic over the pixels of the area of interest 100 allows in particular the network designer to establish whether it is necessary or advisable to modify the network configuration (decision block 230), e.g. by modifying the radio equipment of the radio base stations 105a to 105f, or to add/remove radio base stations, or the like, so as to be able to capture more traffic.

In the affirmative case (exit branch Y), the best server areas 110a to 110f are re-calculated (block 235).

The change in the network configuration causes in general a change in the traffic offered to the cells; thus, the contributions to the offered traffic of the different pixels of the area of interest 100 are re-calculated and updated (block 237).

The process of modifying the network configuration and re-calculating the offered traffic contributions of the different pixels may be repeated once or more.

Once a network configuration that is considered satisfactory has been found, the distributed offered traffic is recombined, re-aggregated, taking into account the possible change in the assignment of the pixels to the serving cells that, in general, will differ from those initially calculated (block 240).

The carried network traffic corresponding to the new network configuration is then calculated (block 245).

The critic of the Applicant to the conventional method of assigning the pixels to the expected serving cells, which as discussed provides for assigning a generic pixel to the cell whose radio base station irradiates at that pixel the strongest estimated signal, started from the observation that measures of the traffic carried by the cells in a real network environment often evidence portions of carried traffic coming from areas that do not belong to the cell best server area calculated in the network planning phase.

The Applicant has realized that the best server areas defined in the usual way are merely an abstract concept, because in the real world there is nothing like a clear-cut, a sharp borderline between the area served by a cell and the area served by another cell. The Applicant has found that the borderline of the serving area of a cell is better described as a border band, a border stripe; considering for example a pixel that, although assigned to the best server area of a first cell, is located close to the borderline with the best server area of a second cell, in real operation it may happen that, at such a pixel, the level of the electromagnetic field produced by the second cell is, at least occasionally, higher than that of the first cell; thus, a mobile terminal located on that pixel will connect to the second cell, instead that to the first cell: the results of the planning process are in this case wrong. This situation, repeated for several pixels, may cause a substantial difference between the results of the planning process and the real world network operation: portions of traffic that, in the planning phase, were supposed to be served, may happen to be actually not served.

The Applicant has found that the problem with the conventional way of assigning the pixels to the serving cells essentially resides in the fact that, in the planning phase, it is intrinsically impossible to have a perfect knowledge of which will be, in the practice, the electromagnetic field levels at the various pixels. While in fact the electromagnetic wave propagation simulators give, for each pixel, a simulated average electromagnetic field level, the actual electromagnetic field level will take, in the area covered by the generic pixel, variable levels, which cannot be exactly determined in advance. Thus, a statistical indetermination characterizes the electromagnetic field level, which can be more correctly described by a probabilistic distribution of values more or less concentrated around to the average value returned by the simulators.

In particular, the Applicant has found that the inevitable statistical indetermination of the electromagnetic field level can be traced back to phenomena including the fading effects, the intrinsic errors committed by the simulators, the field attenuation inside buildings, the so-called "body loss" attenuation, just to cite some.

In greater detail, the probabilistic distribution:

$$\text{Err}_F = N(0, \sigma_1)$$

of the electromagnetic field values with respect to the average field value perceived in a certain area (for example, the average field estimated by the simulators), e.g. in a pixel, due to the (slow) fading effects can be described by a Gaussian function, and has zero average and standard deviation $\sigma_1$ that depends on the typology of the area (presence of buildings, trees, and the like); practically, the following standard deviation values $\sigma_1$ in respect of the slow fading effect for four different types of areas may be used:

| | |
|---|---|
| open area with vegetation: | 3.5 to 4.5 dB; |
| suburban area: | 4.5 to 5.5 dB; |
| urban area: | 5.5 to 6.5 dB; |
| dense urban area: | 6.5 to 7.5 dB, | where the first type of area (open area with vegetation) refers to an area in which there is a percentage of area covered by buildings of no more than approximately 5%; a suburban area is an area wherein the percentage of area covered by buildings ranges from approximately 5% to approximately 20%; an urban area is an area wherein the percentage of area covered by buildings ranges from approximately 20% to approximately 50%; a dense urban area is an area wherein the percentage of area covered by buildings is higher than approximately 50%.

In turn, the probabilistic distribution:

$$\text{Err}_M = N(0, \sigma_2)$$

of the electromagnetic field values due to the errors made by the simulator is as well a Gaussian, and has zero average and variance $\sigma_2$ of a few, e.g. 6 dBs:

Concerning the attenuation of the electromagnetic field caused by the presence of buildings, it is experimentally known that the indoor attenuation margins of the electromagnetic field, at a height of approximately 1.5 m from the ground (essentially, at the first floor of a building), are Gaussian variables whose average value and variance depend on the density of buildings in the area considered, and also on the radio frequency; for example, for the GSM 900 MHz frequency band and the GSM 1800 MHz frequency band the following values have been experimentally obtained:

|  | 900 MHz band | | 1800 MHz band | |
| --- | --- | --- | --- | --- |
|  | Ave [dB] | Std. dev. [dB] | Ave [dB] | Std. dev. [dB] |
| City center | 19.2 | 5.5 | 21.8 | 4.3 |
| Suburbs | 13.0 | 7.5 | 16.1 | 7.2 |

Also, the human body has an attenuating effect on the field propagation, compared to free-air propagation, described as a stochastic variable with standardized average value of 7 dB and with variance depending on the position of the mobile terminal with respect to the body (for example, a mobile terminal equipped with an earphone, which can be kept relatively far away from the user body, experiences a smaller attenuation than a terminal kept close to the user ear).

In the following of the present description, it will be assumed that the static sensitivity of the radio receiver of a generic mobile terminal is that specified in the ETSI standard EN 300 910, GSM (05.05 version 8.5.1, 1999), i.e. −102 dBm for the 900 MHz GSM layer and −100 dBm for the 1800 MHz GSM layer.

It will also be assumed that all the points belonging to a generic pixel have a statistically equivalent propension to generating traffic.

Considering the fading effect, the probability density $f_{E_{lev}}(x)$ describing the probability that the real (i.e., directly measured) electromagnetic field strength $E_{lev}$ in a generic pixel takes certain values is a Gaussian random variable:

$$f_{E_{lev}}(x) = N(\overline{E}_{estim}, \sigma_1)$$

where $\overline{E}_{estim}$ denotes the average, in the considered pixel, of the electromagnetic field strength estimated by the electromagnetic field propagation simulator, while the variance $\sigma_1$ is the indetermination introduced by the fading effect.

In turn, the probability density of the simulator error, i.e. the difference between the estimated average field and the average of the measured field $E_{lev}$ is a Gaussian function having zero average and variance equal to $\sigma_2$:

$$f_{Error}(x) = N(0, \sigma_2).$$

Since:

$$\text{Error} = \overline{E}_{estim} - \overline{E}_{lev},$$

then:

$$\overline{E}_{estim} = \overline{E}_{lev} + \text{Error}.$$

The sum of two independent Gaussian variables is again a Gaussian variable, with average equal to the sum of the averages, and variance equal to the square root of the sum of the squared variances, thus:

$$f_{E_{stima}}(x) = N(\overline{E}_{estim}, \sqrt{\sigma_1^2 + \sigma_2^2}).$$

The effect of the body loss can as well be described by means of a Gaussian variable having average $\mu_{BL}$, and variance $\sigma_{BL}$; thus:

$$f_{E_{stima}}(x) = N(\overline{E}_{estim} - \mu_{BL}, \sqrt{\sigma_1^2 + \sigma_2^2 + \sigma_{BL}^2}).$$

Thus, the various contributions to the probabilistic distribution of the electromagnetic field have the effect of spreading and, in some cases, shifting the probability density function describing the electromagnetic field value with respect to the simple, average value calculated by the simulators.

As discussed in the foregoing, the Applicant has observed that, in general, the conventional way of assigning the pixels to the best server cells is artificious and different from what will happen in the real operation. This has for example an impact on the traffic distribution in the planning phase, so the overall planning process results strongly affected.

In the following, a new method for estimating a coverage of a geographic area will be described, according to an embodiment of the present invention, exploitable for example for assigning the pixels to the serving cells of the area under planning in a traffic distribution process.

Figure 4:
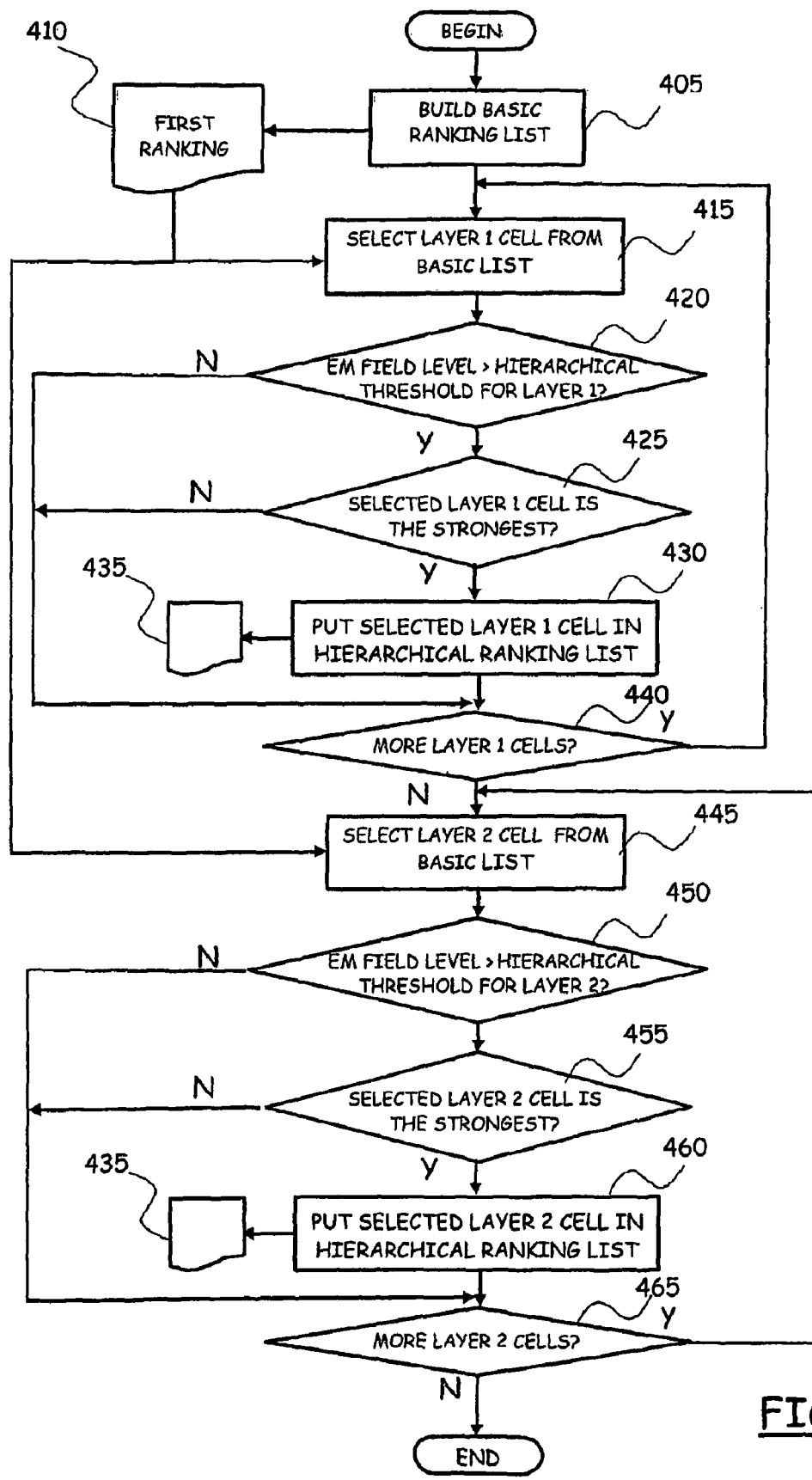
FIG. 4 is a simplified flowchart of an exemplary network access algorithm implemented by the network for assigning serving radio stations to mobile terminals.

For better understanding the method, an exemplary and non limitative procedure by which, in real operation, a mobile terminal accesses the network and is assigned a serving cell is preliminary described, with the help of the schematic flowchart of FIG. 4. It is assumed that the mobile communications network has two hierarchical radio access layers, like for example the layers 900 MHz and 1800 MHz of the GSM networks.

Upon establishment of a call by the mobile terminal, the network assigns a serving cell thereto.

The mobile terminal performs measures of the strength of the electromagnetic field received from different cells, and sends the measured values to the network. The network builds (block 405) a first, basic list of cells 410, wherein all the cells whose signal is perceived by the terminal are listed, ordered according to the perceived level, the strength of the respective electromagnetic field. A filtering may be performed so that the number of cells in the basic list 410 may be limited to the first N cells, in order of decreasing perceived electromagnetic field strength, where N is a predetermined parameter (in other words, the cells producing too low a field in the location of the mobile terminal are not considered).

Then, in a first loop, the cells belonging to the first hierarchical radio access layer (shortly, "layer 1") are considered. Considering the generic iteration of the loop, a layer 1 cell is selected from the basic list 410 (block 415), and it is ascertained whether the electromagnetic field produced by the selected cell exceeds the hierarchical threshold set for the layer 1 (decision block 420). In the negative case (exit branch N of decision block 420), the next layer 1 cell is taken, if any one remains (exit branch Y of decision block 440), otherwise the first loop is exited (exit branch N of decision block 440). In the affirmative case (exit branch Y of decision block 420), it is ascertained whether the electromagnetic field of the considered cell is the strongest of those of the already considered layer 1 cells (decision block 425). In the affirmative case (exit branch Y of decision block 425), the cell is put in a hierarchical ranking list 435 as the best layer 1 serving cell, otherwise (exit branch N of decision block 425) the next layer 1 cell is considered, if any one remains (exit branch Y of decision block 440), or the first loop is exited (exit branch N of decision block 440).

At the end of the first loop, the hierarchical ranking list 435 contains one layer 1 cell, which is the best serving layer 1 cell, or no layer 1 cells, if none of the layer 1 cells in the basic list 410 has a field level exceeding the layer 1 hierarchical access threshold. The layer 1 cell put in the hierarchical ranking list 435 is removed from the basic list 410.

A second loop is then entered, similar to the first loop. The cells belonging to the second hierarchical radio access layer (shortly, "layer 2") are considered. Considering the generic iteration of the loop, a layer 2 cell is selected from the basic list 410 (block 445), and it is ascertained whether the electromagnetic field produced by the selected cell exceeds the layer 2 hierarchical access threshold (decision block 450). In the negative case (exit branch N of decision block 450), the next layer 2 cell is considered, if any one remains (exit branch Y of decision block 465), otherwise the second loop is exited and the procedure ends (exit branch N of decision block 465). In the affirmative case (exit branch Y of decision block 450), it is ascertained whether the electromagnetic field of the considered cell is the strongest of those of the already considered layer 2 cells (decision block 455). In the affirmative case (exit branch Y of decision block 455), the cell is put in the hierarchical ranking list 435 as the best layer 2 serving cell, otherwise (exit branch N of decision block 455) the next layer 2 cell is considered, if any one remains (exit branch Y of decision block 465), or the second loop is exited (exit branch N of decision block 465). The layer 2 cell put in the hierarchical ranking list 435 is removed from the basic list 410.

At the end of the second loop, the hierarchical ranking list 435 may thus contain one layer 1 cell, which is the best serving layer 1 cell, and one layer 2 cell, which is the best serving layer 2 cell, but it may as well contain no layer 1 cells, in case none of the layer 1 cells has a field exceeding the layer 1 hierarchical threshold, and/or no layer 2 cells, in case none of the layer 2 cells has a field that exceeds the layer 2 hierarchical access threshold. All the other, layer 1 and layer 2 cells remain in the basic list 410, ordered according to the respective field strength.

In deciding which serving cell the mobile terminal has to be assigned, the network looks first at the hierarchical ranking list, and then at the basic list 410.

The new method for assigning the pixels to the cells of the area under planning according to the herein described embodiment of the present invention is based on providing a description of the level of the electromagnetic field generated by the cells and perceived on a generic pixel as a stochastic variable, which can take different values with different degrees of probability. In particular, in view of the discussion made in the foregoing, it is assumed that the electromagnetic field is a Gaussian stochastic variable. For the sake of simplicity, it will be assumed that the average value of the electromagnetic field is equal to the value provided by the electromagnetic wave propagation simulator (which is taken as the most probable field value), and the standard deviation takes into account the probabilistic distribution due to the errors of the simulator and the fading effect (pixels totally outdoor are initially considered; a discussion for pixels that are partially or totally indoor will be made later); however, this is not to be construed as a limitation, because also the other effects discussed in the foregoing that affect the electromagnetic field value (in particular, affecting also the average value thereof) may be taken into account. It will be seen that the specific type of network access method impacts the way the probabilities of the various cells of serving a certain pixel are calculated.

The following detailed description is conducted taking as an example the case of two hierarchical radio access layers, for example the GSM 1800 MHz layer (layer 1) and 900 MHz layer (layer 2).

Let it be assumed that a generic pixel receives, from a number $N^{(1)}_{best}$ of layer 1 radio base stations electromagnetic fields having levels described by stochastic variables, wherein the generic stochastic variable $A_i$, i=1, ... $N^1_{best}$ is a Gaussian variable $N(\mu_{A_i}, \sigma^2)$. Similarly, let it be assumed that the same pixel receives, from a number $N^{(2)}_{best}$ of layer 2 radio base stations, electromagnetic field having levels described by stochastic variables, wherein the generic stochastic variable $B_j$, j=1, ... $N^{(2)}_{best}$ is a Gaussian variable $N(\mu_{B_j}, \sigma^2)$; $\mu_{A_i}$ and $\mu_{B_j}$ denote the field levels estimated by the simulator, whereas the variance $\sigma^2$ is the average quadratic error related to the field level estimation; as mentioned in the foregoing, the errors committed by the simulator are due to the impossibility of reproducing in a model the real world conditions experienced by the mobile terminals; for example, the errors may be due to the fading effects caused by obstacles not described in the territory maps used by the simulator, or to the fact the terminals are at different heights from the ground (for example because within a building).

The probability density function of the stochastic variable x (representing in this case the value of the electromagnetic field) is:

$$f(x, \mu) = \frac{1}{\sigma\sqrt{2\pi}} \exp\left[-\frac{(x-\mu)^2}{2\sigma^2}\right],$$

and the corresponding cumulated distribution function is:

$$F(x, \mu) = P(X \le x) = \int_{-\infty}^{x} f(z, \mu)\,dz = \frac{1}{2}\mathrm{erfc}\left(\frac{\mu-x}{\sigma\sqrt{2}}\right).$$

Let the following function be defined:

$$\begin{aligned}G(x, \mu, s) &= P(x < X < s) \\ &= \int_x^s f(z, \mu)\,dz \\ &= \frac{1}{2}\mathrm{erfc}\left(\frac{\mu-s}{\sigma\sqrt{2}}\right) - \frac{1}{2}\mathrm{erfc}\left(\frac{\mu-x}{\sigma\sqrt{2}}\right) \\ &= F(s, \mu) - F(x, \mu)\end{aligned}$$

A hierarchical access threshold is defined, for the two exemplary hierarchical radio access layers layer 1 and layer 2. In particular, the hierarchical access threshold is defined for each cell of each layer: $S_g(A_i)$, i=1, ... $N_{best}^{(1)}$ and $S_g(B_j)$, j=1, ... $N_{best}^{(2)}$. The hierarchical access thresholds correspond to the access thresholds exploited by the network in its real operation in the above described access procedure for building the hierarchical ranking list 435.

Without considering the probabilistic distribution of the electromagnetic field levels, the hierarchical ranking list 435 is built, starting from the first ranking list 410 (wherein all the cells are ordered according to the estimated average electromagnetic field value), determining the serving cell $H_1$ for the first layer as follows:

$$H_1 = \max_{\mu_{A_i} > S_g(A_i)}(\mu_{A_i}).$$

If no layer 1 cell reaches the respective hierarchical access threshold, the cell $H_1$ is not defined. Similarly, the serving cell $H_2$ for the second layer is determined as follows:

$$H_2 = \max_{\mu_{B_j} > S_g(B_j)}(\mu_{B_j})$$

If no layer 2 cell reaches the respective hierarchical access threshold, the cell $H_2$ is not defined.

The cell $H_1$ (when defined) has the highest priority, and the cell $H_2$ has the second-highest priority.

Indicating as $S_0$ the access threshold, that is, the minimum field level that a mobile terminal has to perceive for establishing a call, the best cell among those that remains in the basic list 410 is defined as:

$$H_{br} = \max_{\substack{S_0 < \mu_{A_i} < S_g(A_i) \\ S_0 < \mu_{B_j} < S_g(B_j)}} (A_i, B_j);$$

if no layer 1 or layer 2 cell satisfies the condition $S_0 < \mu < S_g$, the cell $H_{br}$ is not defined; when instead a cell $H_{br}$ can be defined, this cells is the third in order of decreasing priority to be considered by the network in deciding which cell the mobile terminal has to be assigned, after the layer 1 and/or layer 2 cells $H_1$, $H_2$ in the hierarchical ranking list. If none of the cells $H_1$, $H_2$ or $H_{br}$ is defined, the terminal will not be able to access the network, and thus it will not generate traffic.

According to an embodiment of the present invention, taking into account the probabilistic distribution of the electromagnetic field levels, in order to determine which of the cells is expected to be the serving cell for a generic pixel, the probabilities that, in the real network operation, the various cells of the different hierarchical layers will serve a hypothetical mobile terminal located on that pixel are calculated.

In view of the access procedure described in the foregoing, it can be appreciated that the probability that, among all the cells whose field level exceeds the hierarchical threshold $S_g(A_i)$, the generic layer 1 cell $A_i$ is the serving cell for the layer 1 is defined as follows:

$$P_{H_1}(A_i) = Prob(H_1 = A_i)$$
$$= Prob\left(A_i = \max_{A_k > S_g(A_k)} (A_k)\right),$$

whereas the probability that the generic layer 1 cell $A_i$ is the serving cell for the layer 2 is zero:

$$P_{H_2}(A_i) = Prob(H_2 = A_i) = 0.$$

The probability that the layer 1 cell $A_i$ is the best serving cell among all the remaining cells in the basic ranking list is defined as:

$$P_{br}(A_i) = Prob(H_{br} = A_i)$$
$$= Prob\left[A_i = \max_{\substack{S_0 < A_k < S_g(A_k) \\ S_0 < B_l < S_g(B_l)}} (A_k, B_l)\right].$$

Similarly, for each layer 2 cell $B_j$, the following probabilities are defined:

$$P_{H_1}(B_j) = Prob(H_1 = B_j) = 0$$
$$P_{H_2}(B_j) = Prob(H_2 = B_j)$$
$$= Prob\left(B_j = \max_{B_k > S_g(B_k)} (B_k)\right)$$
$$P_{br}(B_j) = Prob(H_{br} = B_j)$$
$$= Prob\left[B_j = \max_{\substack{S_0 < A_k < S_g(A_k) \\ S_0 < B_l < S_g(B_l)}} (A_k, B_l)\right]$$

The probabilities that a generic pixel belongs, i.e. is served by the radio base station of the generic layer 1 cell $A_i$, and, respectively, of the generic layer 2 cell $B_j$ are thus:

$$Prob(A_i) = P_{H_1}(A_i) + P_{br}(A_i)$$
$$Prob(B_j) = P_{H_2}(B_j) + P_{br}(B_j)$$

In addition to the above probabilities, the probability is calculated that, in the considered pixel, the level of the electromagnetic field of every cell is below the mobile terminal access threshold $S_0$, i.e. that the mobile terminal cannot access the network in the considered pixel (this probability, hereinafter referred to as "subthreshold probability", is related to the unexpressed traffic which can potentially be expressed by the pixel) is given by:

$$P_{ss} \prod_1^{N_{best}^{(1)}} Prob(A_i < S_0) \prod_1^{N_{best}^{(2)}} Prob(B_j < S_0).$$

The above defined probabilities are related following equation:

$$\sum_1^{N_{best}^{(1)}} P_{A_i} + \sum_1^{N_{best}^{(2)}} P_{B_j} + P_{ss} = 1.$$

Hereinafter, the above, symbolic calculations are developed for some, exemplary cases.

EXAMPLE 1

Two Radio Base Stations Belonging to the Same Hierarchical Layer

Let it be assumed that a generic pixel receives from a number $N_{best}=2$ of layer 1 radio base stations electromagnetic field levels described by two Gaussian random variables $A_1$, $A_2$ with distributions $N(\mu_{A_1}, \sigma^2)$ and $N(\mu_{A_2}, \sigma^2)$. The probabilities that the generic pixel is assigned, i.e. served by the cell $A_1$ or to the cell $A_2$ are:

$$Prob(A_1) = P_H(A_1) + P_{br}(A_1) \text{ and } Prob(A_2) = (A_2) + P_{br}(A_2).$$

In particular, the above expressions for the probabilities $Prob(A_1)$ and $Prob(A_2)$ can be derived observing that, e.g., the probability $Prob(A_1)$ of the cell $A_1$ of being the serving cell for the considered pixel is based on the following events (similar reasoning holds true for the other cell):

the field perceived in the pixel and irradiated by the radio base station of the cell $A_1$ is higher than the field perceived in the pixel and irradiated by the radio base station of the cell $A_2$, or even if the field perceived in the pixel and irradiated by the radio base station of the cell $A_1$ is lower than field perceived in the pixel and irradiated by the radio base station of the cell $A_2$, the latter field level is below the respective hierarchical access threshold $S_g(A_2)$, or even if the fields of all the cells are below the respective hierarchical access threshold, the field perceived in the pixel and irradiated by the radio base station of the cell $A_1$ is the highest.

Figure 5:
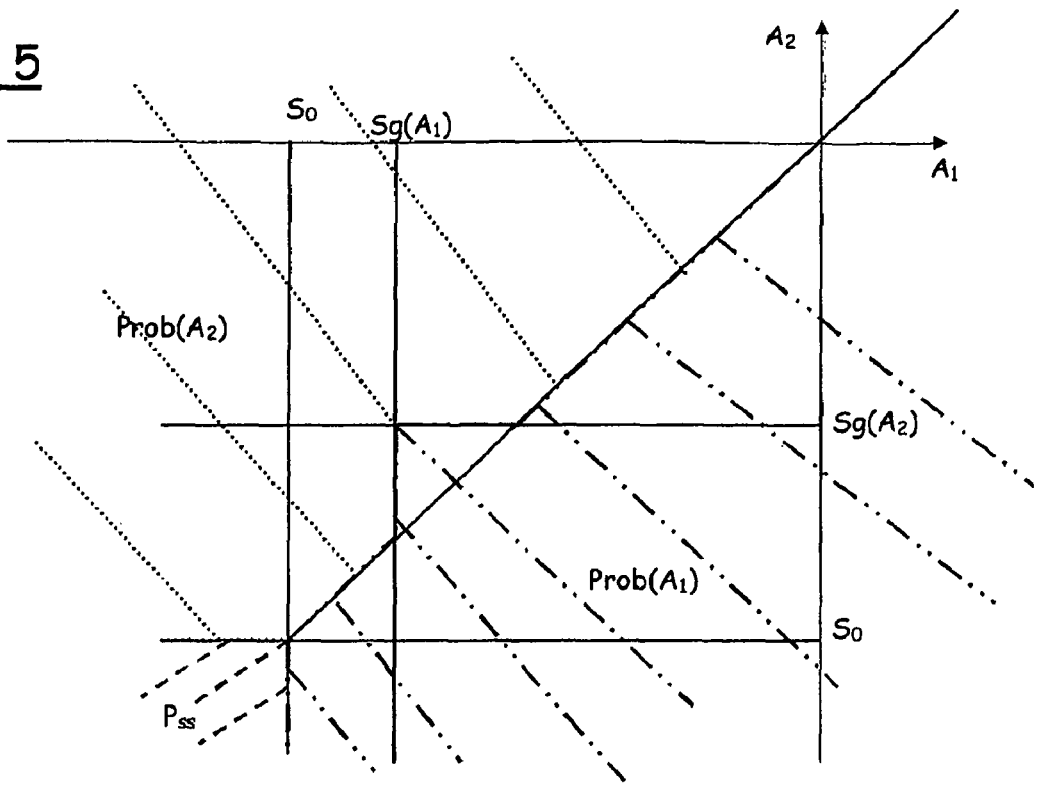
FIG. 5 is an example of an integration domain for integrating probability density functions expressing probabilistic distributions of the electromagnetic field on a generic pixel, in a simple case of two radio base stations of a same radio access layer.

Assuming for example that:

$$S_g(A_1) < S_g(A_2),$$

the probabilities Prob($A_1$) and Prob($A_2$) can be determined by considering the integration regions depicted in FIG. 5, wherein the horizontal axis represents the random variable $A_1$, that is possible values of the electromagnetic field irradiated by the radio base station of the cell $A_1$ and perceived in the considered pixel, and the vertical axis represents the random variable $A_2$ (the same symbol is used for simplicity for indicating a generic cell, and the corresponding random variable representing the possible values of the electromagnetic field irradiated by the cell's radio base station and perceived at a certain pixel):

$$Prob(A_1) = Prob(A_1 > A_2, A_1 > S_g(A_1)) ++$$
$$Prob(A_1 < A_2, A_1 > S_g(A_1), A_2 < S_g(A_2)) ++$$
$$Prob(A_1 > A_2, S_0 < A_1 < S_g(A_1), A_2 < S_g(A_2))$$

and $$Prob(A_2) = Prob(A_2 > A_1, A_2 > S_g(A_2)) ++$$
$$Prob(A_2 > A_1, S_0 < A_2 < S_g(A_2), A_1 < S_g(A_1))$$

The addends in the above expressions can be calculated as follows:

$$Prob(A_1 > A_2, A_1 > S_g(A_1)) =$$
$$\int_{S_g(A_1)}^{+\infty} da_1 \int_{-\infty}^{a_1} f_{A_1}(a_1, \mu_{A_1}) f_{A_2}(a_2, \mu_{A_2}) da_2 ==$$
$$\int_{S_g(A_1)}^{+\infty} da_1 f_{A_1}(a_1, \mu_{A_1}) \frac{1}{2} \mathrm{erfc}\left(\frac{\mu_{A_2} - a_1}{\sigma\sqrt{2}}\right) da_1$$

$$Prob(A_1 < A_2, A_1 > S_g(A_1), A_2 < S_g(A_2)) ==$$
$$\int_{S_g(A_1)}^{S_g(A_2)} da_1 \int_{a_1}^{S_g(A_2)} f_{A_1}(a_1, \mu_{A_1}) f_{A_2}(a_2, \mu_{A_2}) da_2 ==$$
$$\int_{S_g(A_1)}^{+\infty} f_{A_1}(a_1, \mu_{A_1}) \left[\frac{1}{2}\mathrm{erfc}\left(\frac{\mu_{A_2} - S_g(A_2)}{\sigma\sqrt{2}}\right)\right] - \frac{1}{2}\mathrm{erfc}\left(\frac{\mu_{A_2} - a_1}{\sigma\sqrt{2}}\right) da_1$$

and $$Prob(A_1 > A_2, S_0 < A_1 < S_g(A_1), A_2 < S_g(A_2)) ==$$
$$\int_{S_0}^{S_g(A_1)} da_1 \int_{-\infty}^{a_1} f_{A_1}(a_1, \mu_{A_1}) f_{A_2}(a_2, \mu_{A_2}) da_2 ==$$
$$\int_{S_0}^{S_g(A_1)} f_{A_1}(a_1, \mu_{A_1}) \frac{1}{2}\mathrm{erfc}\left(\frac{\mu_{A_2} - a_1}{\sigma\sqrt{2}}\right) da_1$$

Similarly, for the probability Prob($A_2$):

$$Prob(A_2 > A_1, A_2 > S_g(A_2))$$
$$\int_{S_g(A_2)}^{+\infty} da_2 \int_{-\infty}^{a_1} f_{A_2}(a_2, \mu_{A_2}) f_{A_1}(a_1, \mu_{A_1}) da_1 ==$$
$$\int_{S_g(A_2)}^{+\infty} f_{A_2}(a_2, \mu_{A_2}) \frac{1}{2}\mathrm{erfc}\left(\frac{\mu_{A_1} - a_2}{\sigma\sqrt{2}}\right) da_2$$

and $$Prob(A_2 > A_1, S_0 < A_2 < S_g(A_2), A_1 < S_g(A_1)) =$$
$$\int_{S_0}^{S_g(A_2)} da_2 \int_{-\infty}^{a_2} f_{A_1}(a_1, \mu_{A_1}) f_{A_2}(a_2, \mu_{A_2}) da_1 ==$$
$$\int_{S_g(A_1)}^{+\infty} f_{A_2}(a_2, \mu_{A_2}) \frac{1}{2}\mathrm{erfc}\left(\frac{\mu_{A_1} - a_2}{\sigma\sqrt{2}}\right) da_1$$

The probabilities calculated above do not take into account the possible unexpressed traffic due to level of the electromagietic field falling below the access threshold $S_0$, which is instead given by:

$$P_{SS} = Prob(A_1 < S_0) \cdot Prob(A_2 < S_0).$$

EXAMPLE 2

Two radio base stations belonging to different hierarchical layer

Let now the case be considered of a network having two different hierarchical access layers, with the first layer (layer 1) having priority over the second layer (layer 2).

Let A denote the Gaussian random variable describing the electromagnetic field level for the layer 1, expressed by the distribution $N(\mu_A, \sigma^2)$, and let B denote the random variable describing the electromagnetic field level for the layer 2, expressed by the distribution $N(\mu_B, \sigma^2)$, let $S_g(A)$ and $S_g(B)$ denote the respective hierarchical access thresholds. Two cases can be identified:

a—$S_g(A) \geq S_g(B)$
b—$S_g(A) < S_g(B)$

Figure 6A:
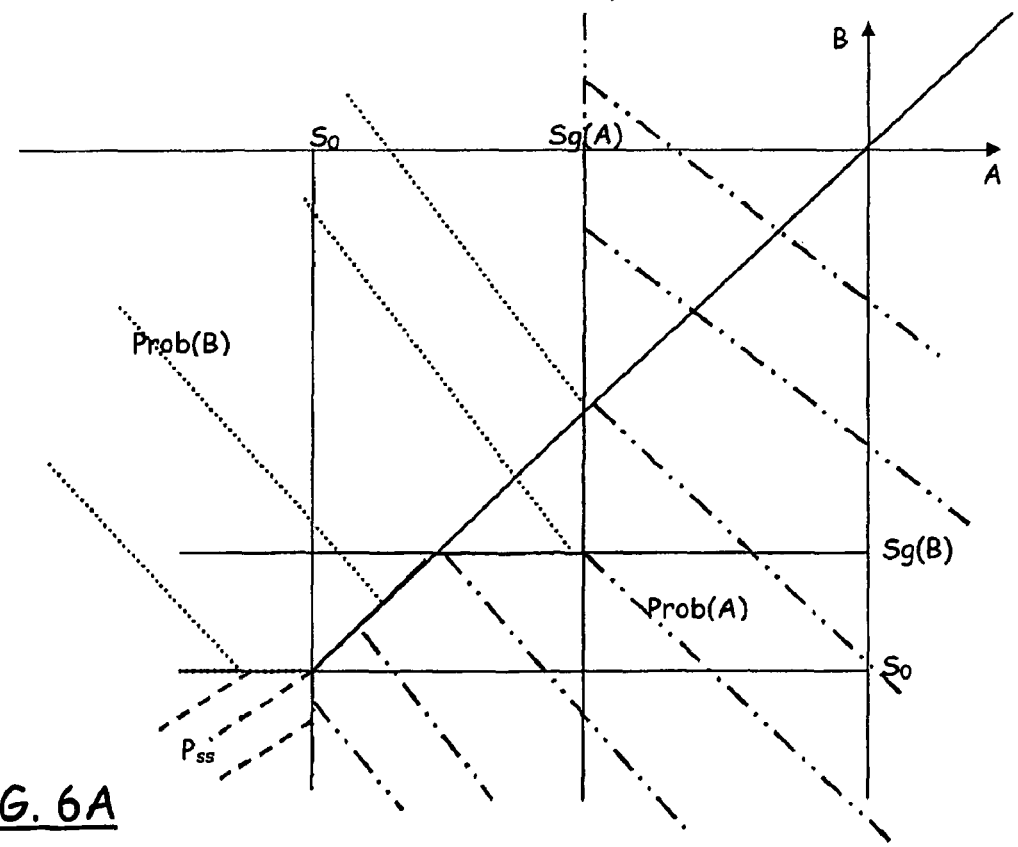
FIGS. 6A, 6B and 6C are examples of possible integration domains in another simple case of two radio base stations of two radio access layers having different priorities.
Figure 6B:
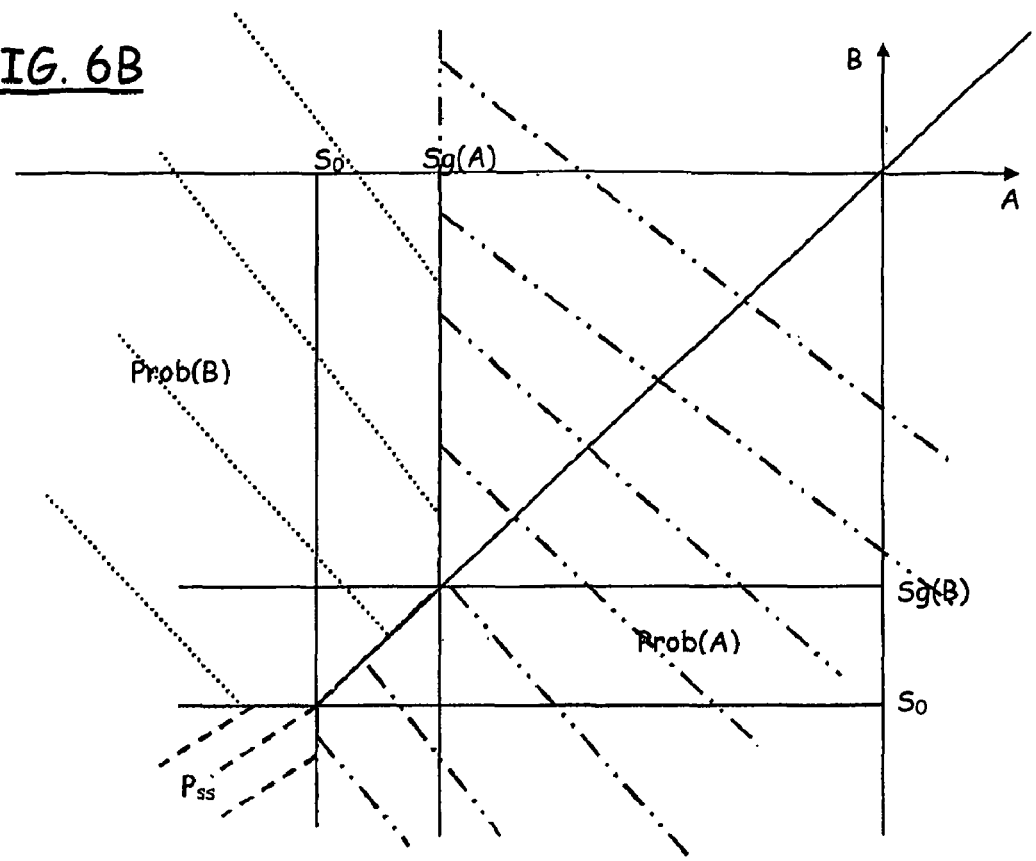

Case a: this is the case that is most typical in the practice; the probabilities Prob(A) and Prob(B) can be determined by considering the integration regions depicted in FIG. 6A (for the case $S_g(A) > S_g(B)$) and FIG. 6B (for case $S_g(A) > S_g(B)$).

Since the layer 1 is the priority hierarchical access, each time the electromagnetic field level of the radio base station of the cell A is higher than the respective hierarchical access threshold $S_g(A)$, the hypothetical mobile terminal located on the pixel considered is assigned to this cell, even if the level of the perceived field irradiated by the radio base station of the cell B is higher. It follows that:

$$Prob(A) = Prob(A > S_g(A)) + Prob(A > B, S_0 < A < S_g(A), B < S_g(B)),$$

and thus:

$$Prob(A > S_g(A)) = \int_{S_g(A)}^{-\infty} f_A(a, \mu) da$$
$$= \frac{1}{2}\mathrm{erfc}\left(\frac{S_g(A) - \mu_A}{\sigma\sqrt{2}}\right),$$

whereas:

$$Prob(A > B, S_0 < A < S_g(A), B < S_g(B)) =$$
$$\int_{S_0}^{S_g(B)} da \int_{-\infty}^{a} f_A(a, \mu_A) f_B(b, \mu_B) db ++$$
$$\int_{S_g(B)}^{S_g(A)} da \int_{-\infty}^{S_g(B)} f_A(a, \mu_A) f_B(b, \mu_B) db =$$
$$\int_{S_0}^{S_g(A)} f_A(a, \mu_A) \frac{1}{2}\mathrm{erfc}\left(\frac{\mu_B - a}{\sigma\sqrt{2}}\right) da +$$

$$\int_{S_g(B)}^{S_g(A)} f_A(a, \mu_A) \frac{1}{2} \mathrm{erfc}\left(\frac{\mu_B - S_g(B)}{\sigma\sqrt{2}}\right) da$$

The mobile terminal connects instead to the cell B each time the perceived field irradiated from the radio base station of the cell B exceeds the respective hierarchical access threshold, while the perceived field irradiated from the radio base station of the cell A is below the respective hierarchical access threshold; the mobile terminal also connects to the cell B when both the field levels are below the respective hierarchical access threshold, but the field level of the cell B is higher than that of the cell A. The probability that the cell B is the serving cell is thus:

$$Prob(B) = Prob(B > S_g(B), A < S_g(A)) +$$

$$Prob(B > A, S_0 < B < S_g(B), A < S_g(A)) =$$

$$= \int_{S_g(B)}^{+\infty} db \int_{-\infty}^{S_g(A)} f_A(a, \mu_A) f_B(b, \mu_B) da +$$

$$\int_{S_0}^{S_g(B)} db \int_{-\infty}^{b} f_A(a, \mu_A) f_B(b, \mu_B) db$$

$$= \int_{S_g(B)}^{-\infty} f_B(b, \mu_B) \frac{1}{2} \mathrm{erfc}\left(\frac{\mu_A - S_g(A)}{\sigma\sqrt{2}}\right) db +$$

$$\int_{S_0}^{S_g(B)} f_B(b, \mu_B) \frac{1}{2} \mathrm{erfc}\left(\frac{\mu_A - b}{\sigma\sqrt{2}}\right) db$$

Also in this case, the probability of having unexpressed traffic due to level of the electromagnetic field falling below the access threshold $S_0$, is given by:

$$P_{SS} = Prob(A_1 < S_0) \cdot Prob(A_2 < S_0).$$

Figure 6C:
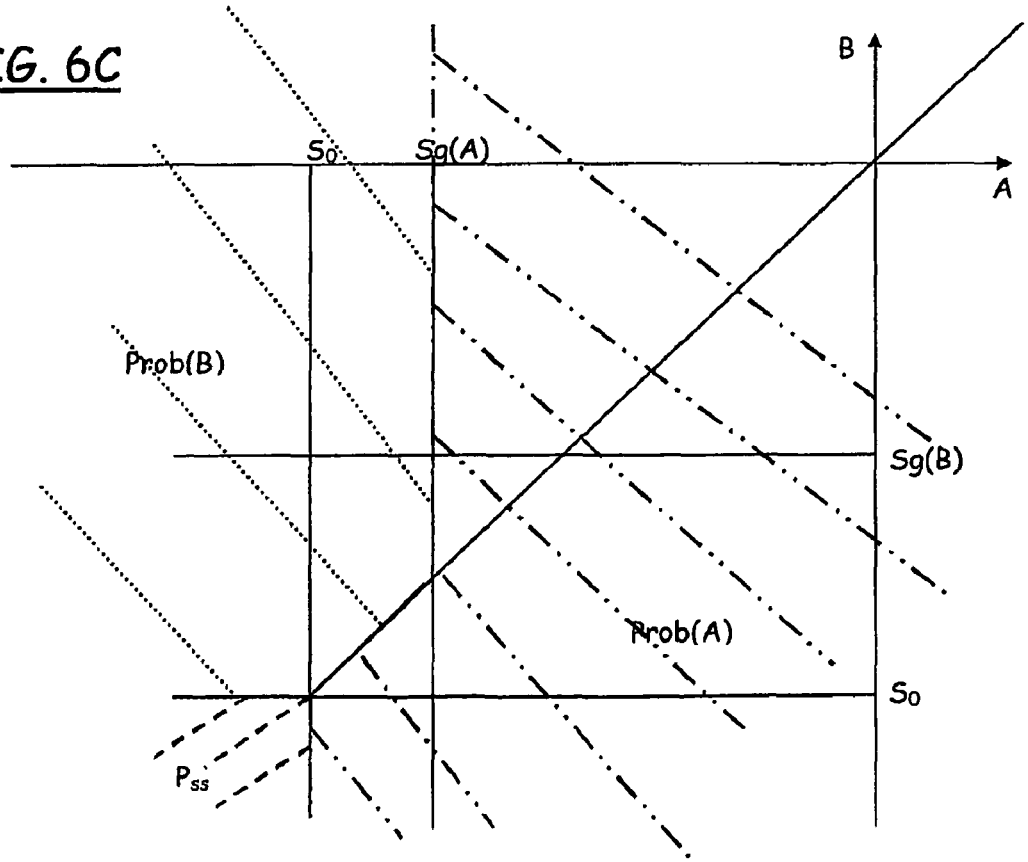

Case b: in this situation, not very frequent in the practice, the probabilities can be calculated considering the integration regions depicted in FIG. 6C:

$$Prob(A) = Prob(A > S_g(A)) +$$

$$Prob(A > B, S_0 < A < S_g(A), B < S_g(B))$$

$$= \int_{S_g(A)}^{-\infty} f_A(a, \mu_A) da \int_{S_0}^{S_g(A)} da \int_{-\infty}^{a} f_A(a, \mu_A) f_B(b, \mu_B) db =$$

$$= \frac{1}{2} \mathrm{erfc}\left(\frac{S_g(A) - \mu_A}{\sigma\sqrt{2}}\right) + \int_{S_0}^{S_g(A)} f_A(a, \mu_A) \frac{1}{2} \mathrm{erfc}\left(\frac{\mu_B - a}{\sigma\sqrt{2}}\right) da$$

$$Prob(B) = Prob(B > S_g(B), A < S_g(A)) +$$

$$Prob(B > A, S_0 < B < S_g(B), A < S_g(A)) =$$

$$= \int_{S_g(B)}^{-\infty} db \int_{-\infty}^{S_g(A)} f_A(a, \mu_A) f_B(b, \mu_B) da +$$

$$\int_{S_0}^{S_g(A)} db \int_{-\infty}^{b} f_A(a, \mu_A) f_B(b, \mu_B) da +$$

$$\int_{S_g(A)}^{S_g(B)} db \int_{-\infty}^{S_g(A)} f_A(a, \mu_A) f_B(b, \mu_B) da =$$

$$= \int_{S_g(B)}^{-\infty} f_B(b, \mu_B) \frac{1}{2} \mathrm{erfc}\left(\frac{\mu_A - S_g(A)}{\sigma\sqrt{2}}\right) db +$$

$$\int_{S_0}^{S_g(A)} f_B(b, \mu_B) \frac{1}{2} \mathrm{erfc}\left(\frac{\mu_A - b}{\sigma\sqrt{2}}\right) db +$$

$$\int_{S_g(A)}^{S_g(B)} f_B(b, \mu_B) \frac{1}{2} \mathrm{erfc}\left(\frac{\mu_A - S_g(A)}{\sigma\sqrt{2}}\right) db$$

EXAMPLE 3

N cells belonging to either one of two hierarchical access layers

The analysis conducted so far for the previous two simple exemplary cases can be extended to the more general case in which two hierarchical access layers exist, and N cells are received on a generic pixel. The possible scenarios are:

all the N cells belong to the first hierarchical layer: $N=N_A$;
all the cells belong to the second hierarchical layer: $N=N_B$;
$N_A$ cells belong to the first layer, $N_B$ cells belong to the second layer, with $N=N_A+N_B$.

For the sake of simplicity, it is assumed that the hierarchical access thresholds of the cells belonging to the first layer are higher than those of the cells belonging to the second layer (this is the situation normally encountered in a real network).

Denoted with:

$$A_i, i=N_B+1, \ldots N_A+N_B$$

the Gaussian random variables describing the levels of electromagnetic field for the layer 1, having average $\mu_A$ and variance $\sigma^2$, and with $$B_i, i=1, \ldots N_B$$

the Gaussian random variables describing the levels of electromagnetic field for the layer 2 cells, having average $\mu_{B_i}$ and variance $\sigma^2$, the random variables are ordered according to the hierarchical access thresholds set for the respective cells, i.e.:

$$S_g(B_1) < \ldots < S_g(A_{N_B}) < S_g A_{N_B} < \ldots S_g(A_N).$$

The following set of indexes are defined:

$$\overline{K} = \{1, \ldots, N\} = K_B \cup K_A$$

with $$K_B = K_B^- \cup \{i\} \cup K_B^+$$

wherein $$K_B^- = \{1, \ldots, i-1\}$$

and $$K_B = K_B^- \cup \{i\} \cup K_B^+$$

wherein $$K_B^- = \{1, \ldots, i-1\}$$

and $$K_B^+ = \{i+1, \ldots, N_B\}$$

and $$K_A = K_A^- \cup \{i\} \cup K_A^+$$

wherein $$K_A^- = \{N_B+1, \ldots, i-1\}$$

and $$K_A^+ = \{i+1, \ldots, N_B+N_A\}.$$

In order to determine the probability that the generic cell $A_i$, $\forall i \in K_A$ is the serving cell for the considered pixel, the following events are defined.

$$R_{i,0}^A = \begin{cases} A_i > S_g(A_i) \\ A_i > A_j, & \forall j \in K_A^- \cup K_A^+ \end{cases}$$

this event exhaustively represents all the possible cases wherein the cell $A_i$ is the serving cell for a generic pixel, because its electromagnetic field level exceeds the respective hierarchical threshold $S_g(A_i)$ and, at the same time, it is higher than the electromagnetic field level of all the other cells that are perceived at the considered pixel. Since at least one layer 1 cell is above the respective hierarchical access threshold, the electromagnetic field levels of the layer 2 cells need not examined.

For each non-void subset $J \subseteq K_A^+$, the event $$R_{i,J}^A = \begin{cases} S_g(A_i) < A_i < \min_{j \in J}(S_g(A_j)) \\ A_i < A_j < S_g(A_i), & \forall j \in J \\ A_i > A_k, & \forall k \in K_A^- \cup [K_A^+ \setminus J] \end{cases}$$

exhaustively represents all the possible cases in which the cell $A_i$ is the serving cell for the considered pixel even if there is another cell $A_j$ whose field level is higher than that of the cell $A_i$, but below the respective hierarchical access threshold $S_g(A_j)$. Also in this case, the field levels of the layer 2 cells need not examined. It can be appreciated that $R_{i,0}^A$ coincides with $R_{i,J}^A$ with $J = \emptyset$.

Finally, the event $$V_i^A = \begin{cases} S_0 < A_i < S_g(A_i), \\ A_i > A_j, & A_j < S_g(A_j) \forall j \in K_A^- \cup K_A^+, \\ A_i > B_k, & B_k < S_g(B_k) \forall k \in K_B \end{cases}$$

is defined, exhaustively representing all the possible cases in which the cell $A_i$ is the serving cell for the considered pixel, because all the cells are below the respective hierarchical access thresholds, and the cell $A_i$ has the highest field level in the considered pixel. This event describes the situation in which the serving cell is taken from the cells in the basic list 410.

The following relationships between the previously defined events can be established:

$$R_{i,0}^A \cap R_{i,J}^A = \emptyset, \forall J \subseteq K_A^+ \quad (a)$$

$$R_{i,J_1}^A \cap R_{i,J_2}^A = \emptyset, \forall J_1 \neq J_2 \subseteq K_A^+ \quad (b)$$

$$R_{i,0}^A \cap V_i^A = \emptyset \quad (c)$$

$$R_{i,j}^A \cap V_i^A = \emptyset \; \forall j \neq i \quad (d)$$

In particular, relation (a) holds true because the conditions:

$$A_i > A_j, \forall j \in K_A^- \cup K_A^+$$

in $R_{i,0}^A$ and $$A_i < A_j < S_g(A_j), \forall j \in J$$

in $R_{i,J}^A$ are disjoined. Relation (b) is valid because the sets $J_1$ and $J_2$ are distinct, and this the conditions:

$$A_i < A_j < S_g(A_j), \forall j \in J_1$$

and $$A_i < A_j < S_g(A_j), \forall j \in J_2$$

are disjoined. Relation (c) is valid because the intersection of the conditions:

$$A_i > S_g(A_i)$$

and $$S_0 < A_i < S_g(A_j)$$

is void. The relation (d) holds true because the intersection of the conditions:

$$S_g(A_i) < A_i < \min_{j \in J}(S_g(A_j))$$

and $$S_0 < A_i < S_g(A_j)$$

is void.

The probability that the generic layer 1 cell $A_i$, $\forall i \in K_A$ is the serving cell for the considered pixel can thus be calculated as:

$$\mathrm{Prob}(A_i) = \mathrm{Prob}(R_{i,0}^A) + \mathrm{Prob}\left(\bigcup_{J \subseteq K_A^+} R_{i,J}^A\right) + \mathrm{Prob}(V_i^A).$$

In a similar way, for calculating the probability that the generic layer 2 cell $B_i$, $\forall i \in K_B$ is the best server the following events are defined:

$$R_{i,0}^B = \begin{cases} B_i > S_g(B_i) \\ B_i > B_j, & \forall j \in K_B^- \cup K_B^+ \\ A_k < S_g(A_k), & \forall k \in K_A \end{cases}$$

representing the situation in which the field level of the cell $B_i$ is the highest among those of the cells belonging to the layer 2, and at the same time all the cells of the layer 1 are below the respective hierarchical access threshold.

For each subset $J \subseteq K_B^+$ the set $$R_{i,J}^B = \begin{cases} S_g(B_i) < B_i < \min_{j \in J} S_g(B_j) \\ B_i < B_j < S_g(B_j), & \forall j \in J \\ B_i > B_l, & \forall l \in K_B^- \cup [K_B^+ \setminus J] \\ A_k < S_g(A_k), & \forall k \in K_A \end{cases}$$

is defined, representing the situation in which the cell $B_i$, is the best server even if there is a cell $B_j$, with a higher field level, but below the respective hierarchical access threshold $S_g(B_j)$, and none of the cells of the layer 1 reaches the respective hierarchical access threshold. For each $j \in K_B^- \cup K_B^+$, the set $$V_i^A = \begin{cases} S_0 < B_i < S_g(B_i), \\ B_i > B_j, & B_j < S_g(B_j) \forall j \in K_B^- \cup K_B^+, \\ B_i > A_k, & A_k < S_g(A_k) \forall k \in K_A \end{cases}$$

is defined, in which the cell $B_i$, has the highest field level when the field levels of all the other cells are below the respective hierarchical access threshold, irrespective of the hierarchical layer.

The probability that the generic layer 2 cell $B_i$ is the serving cell can similarly be calculated as:

$$Prob(B_i) = Prob(R_{i,0}^B) + Prob\left(\bigcup_{J \subseteq K_B^+} R_{i,J}^B\right) + Prob(V_i^B).$$

The probability $P_{SS}$ the mobile terminal perceives a signal below the access threshold $S_0$ is:

$$P_{SS} = \prod_{i \in K_A} \int_{-\infty}^{S_0} f(a_i, \mu_{A_i}) da_i \prod_{j \in K_B} \int_{-\infty}^{S_0} f(b_j, \mu_{B_{ji}}) db_j.$$

Thus, it is:

$$\sum_{i \in K_A} Prob(A_i) + \sum_{i \in K_B} Prob(B_i) + P_{SS} = 1.$$

It is underlined that the cases described above are to be considered merely exemplary, and not limitative. In particular, the described method is not limited to cases of just one or two hierarchical access layers, and can be extended to any number of hierarchical access layers. In particular, in order to extend the applicability to M hierarchical access layers, it is sufficient to define the events that correspond to a certain cell of a generic hierarchical layer being the best server, in line with what described in the foregoing for two access layers (the number of conditions to be taken into account will vary accordingly).

Figure 7:
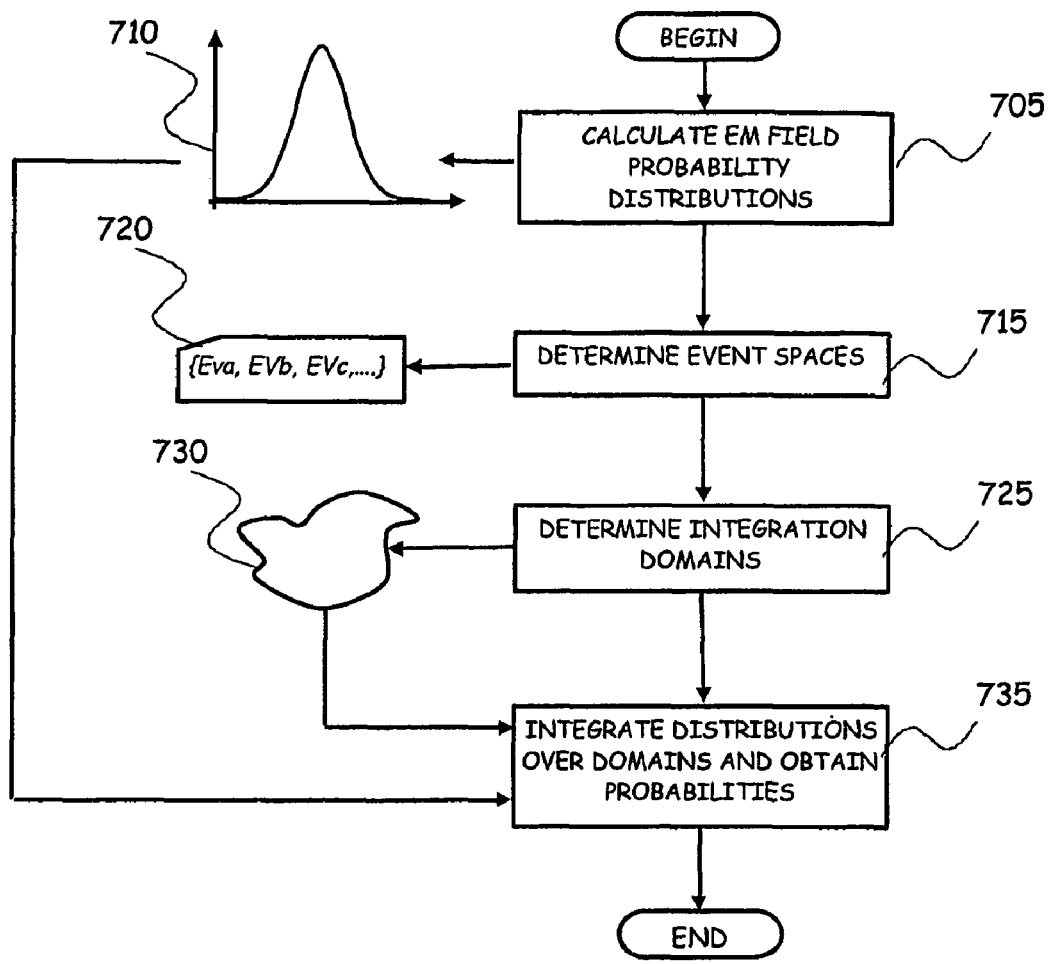
FIG. 7 is a simplified flowchart of a procedure for calculating probabilities of the network cell of being serving cells for the pixels, in an embodiment of the present invention.

The schematic flowchart of FIG. 7 depicts the main steps of the general method according to the described embodiment of the present invention for calculating the probabilities that the various cells of the area under planning have to be the serving cells for a certain, generic pixel.

Firstly (block 705), for each pixel of the area under planning the probability distributions 710 of the levels of the electromagnetic field irradiated by the different radio base stations and perceived at the considered pixel are calculated, starting from the estimated electromagnetic field values calculated by the simulators. In particular, a filtering can be performed on the cells, so as to keep only the first N cells in decreasing order of estimated electromagnetic field level.

Then (block 715), for the generic cell, a respective event space 720 is built including all the possible events that correspond to that cell being the serving cell of a hypothetic mobile terminal located on the considered pixel. In particular, the event spaces can be built taking into account which, in the real network operation, is the access algorithm exploited by the network for deciding which cell is to serve a certain mobile terminal requesting to establishing a communication link.

The event spaces 720 are used to build (block 725) integration domains 730 over which the statistical distribution functions 710 will have to be integrated (block 735) to obtain corresponding probabilities that the cells are the serving cells for the considered pixel; in the same way, the probability that no cell can be the serving cell for that pixel, i.e. that the considered pixel will not be served by any cell is calculated.

In a way similar to that described in detail for the determination of the serving cell (first-choice serving cell), it is possible to determine, for each pixel of the area of interest, the probability that the generic cell $X_m$, with $m=1, \ldots, N$, $m \neq k$, is the second-choice serving cell for that pixel, conditioned to the fact that the cell $X_k$ is the serving cell; the probability is given by:

$$Prob\left(\frac{X_m = \text{second-choice server}}{X_k = \text{best server}}\right) = \frac{Prob(X_m = \text{second-choice server}, X_k = \text{best server})}{Prob(X_k = \text{best server})}$$

wherein the numerator is the joint probability $Prob(X_m'', X_k')$ that is calculated defining all the possible (mutually exclusive) events for which the cell $X_m$ is the second-choice server and $X_k$ the best (first-choice) serving cell.

The probability that a generic cell is the second-choice serving cell of a generic pixel can be used to estimate how much traffic lost by other cells can be captured as overflow traffic by a cell when the latter acts as second-choice serving cell.

In a similar way, it is possible to calculate the probabilities that a certain cell is the third-choice, fourth-choice or, in general, the $r^{th}$-choice serving cell for a certain pixel.

Up to now, totally outdoor pixels have implicitly been considered. In case of presence of buildings, the indoor attenuation should be taken into account; this can be done by introducing a Gaussian variable with average equal to the indoor attenuation (which depends on the area typology and frequency of the radio electric signal) and variance $\sigma_{Indoor}$ (for example, with the values reported above); thus, the probability density function describing the electromagnetic field values becomes:

$$f_{E_{estim}}(x) = N(\overline{E}_{estim} - \mu_{BL} - \mu_{Indoor}, \sqrt{\sigma_1^2 + \sigma_2^2 + \sigma_{BL}^2 + \sigma_{Indoor}^2}).$$

The calculations described in the foregoing for determining the probabilities that the cells are serving cells for the considered (totally indoor) pixels are repeated.

In the case of partially indoor pixels, a parameter Edi can be adopted to numerically describe the degree of presence of buildings in a generic pixel; for example, the value of the parameter Edi may range from 0 to 1, wherein a parameter value Edi=0 corresponds to an essentially total absence of buildings in the area of that pixel (i.e., to a totally outdoor pixel), whereas a parameter value Edi=1 corresponds to a pixel whose area is essentially totally covered by buildings (i.e., to a totally indoor pixel). The probabilities for the various cells of being the serving cells for a partially indoor pixels, as well as the sub-threshold probabilities, can be calculated by calculating the probabilities $P_{out}$ and $P_{in}$ assuming that the pixel is totally outdoor and totally indoor, and then combining the results in a weighted sum:

$$P = P_{out} \times (1 - Edi) + P_{in} \times Edi.$$

It is pointed out that although in the foregoing reference has been made to a particular type of network access algorithm, this is not to be intended as a limitation of the present invention, which can be applied more generally irrespective of the access algorithm employed. Indeed, whichever the access algorithm used, it is possible to calculate the probability that a generic cell has of being the serving cell (or the second-choice, third-choice, etc. serving cell) for a certain pixel, by suitably defining the event spaces, so that they contain exhaustive and mutually exclusive events from which the integration domains of the field level probability density distributions can be determined. Different access algorithms may lead to different event spaces, and thus to different probabilities for the cells to be serving cells in a generic pixel.

Also, the probability density distributions need not be Gaussian, as assumed in the foregoing merely for the sake of simplicity of the calculations.

As described in the foregoing, in connection with FIG. 2, the calculated probabilities may be exploited for distributing the calculated offered traffic across the various pixels of the area under planning.

In particular, for each cell of the area under planning, a matrix can be built, whose elements represent the pixels of the area of interest (the number of pixels that are considered for each cell need not be all the pixels of the area under planning, particularly the number of pixels considered for the generic cell may depend on a predetermined distance, for example an area within a circle of a predetermined radius, e.g. 80 Km centered on the radio base station of a cell); to each pixel of the matrix, a number is assigned that expresses the probability (calculated in the way described above) that the considered cell has of being the serving cell for that pixel (more generally, k numbers may be associated to each pixel of the matrix, describing the probabilities that the considered cell has of being the first-choice serving cell, the second-choice serving cell, . . . , the $k^{th}$-choice serving cell for that pixel).

If a cell, in a generic pixel, has a non-zero probability of being the first-choice serving cell, then that pixel has a probability of offering traffic to the cell. Thus, the offered traffic offered to the cell should be distributed also to that pixel. In other words, the offered traffic is distributed to all those pixels for which the considered cell has a non-zero (or non-negligible) probability of being the best, first-choice serving cell.

As mentioned in the foregoing, the distribution of the traffic is done taking into account traffic generation propensions of the different pixels. The matrix 300 of traffic generation propensions, wherein, for the generic pixel $px_{ij}$ of the area 100 of interest, a respective traffic generation propension $\tau_{ij}$ is expressed, in terms for example of a number ranging from 0 to 1, and indicating a propension of that pixel $px_{ij}$ to generate traffic, provides an indication of a forecasted population of users of the network services (i.e., traffic-generating users) that will be present on each pixel.

In order to calculate the traffic generation propensions, characteristic parameters of the territory are taken into account, like for example the presence of buildings, of communications routes like roads or railways, the morphology of the territory (nature of the area: urban, industrialized, open area; the orography).

In particular, and just by way of example, starting on information describing the territorial morphology of the geographic area of interest, like the dislocation of buildings, the orographic characteristics, the presence of roads, motorways, railways, and similar information, a first matrix of values is built, wherein each element (i,j) of the matrix corresponds to a respective pixel $px_{ij}$ of the area of interest, and is a number ranging for example from a lower limit, wherein the lower limit corresponds to an absence of network traffic, and the upper limit to a maximum level of network traffic. An averaging may preferably be implemented, so that the value of the generic element (i,j) of the matrix, corresponding to the pixel $px_{ij}$, is the average of the values of the neighboring matrix elements, corresponding to the surrounding pixels.

For example, a first matrix of values is calculated, wherein the generic element $\tau_1(i,j)$ of the matrix, corresponding to a respective pixel $px_{ij}$, is assigned: a low value, for example equal to 0, for a low percentage of coverage of the area of the pixel by buildings, equal for example to 2%; a value equal to 10 times the percentage of coverage of the area of the pixel by buildings, if such percentage is in the range from 2% to 70%; and a high value, for example 700, for a percentage of coverage of the area of the pixel by buildings higher than, for example, 70%.

The values thus obtained are averaged, taking the nine neighboring matrix elements, corresponding to the nine surrounding pixels, thereby obtaining a second matrix of values $\tau_2(i,j)$.

A third matrix of values is calculated taking, for the generic element $\tau_3(i,j)$, the highest among the corresponding values $\tau_1(i,j)$ and $\tau_2(i,j)$, i.e. $\tau_3(i,j)=\max[\tau_1(i,j), \tau_2(i,j)]$.

In a similar way, the information relating to the morphology of the territory (e.g., presence of woods, open areas, presence of fields, presence of lakes, rivers, and the like), the information relating to the presence of roads, motorways, railways, and so on are progressively taken into account.

Based on the traffic generation propension matrix and on the best server probability matrix, the offered traffic may be distributed in the following way.

Let $T_{tot}^{off.PURE}(A_k)$ denote the pure offered traffic offered to the generic cell $A_k$ wherein, by "pure" offered traffic there is meant the overall offered traffic, depurated by the overflow traffic that is actually offered to other cells but that cannot be served by them and therefore falls on the considered cell); it is:

$$T_{i,j}^{off.PURE}(A_k) = T_{tot}^{off.PURE}(A_k) \frac{P_{i,j}(A_k) \cdot \tau_{i,j}}{\sum_{(i,j) \in A_k} P_{i,j}(A_k) \cdot \tau_{i,j}}$$

wherein $P_{i,j}(A_k)$ is the probability that the cell $A_k$ is the (first-choice) serving cell for the pixel $p_{i,j}$, calculated as described above, and $\tau_{i,j}$ is the traffic generation propension of the pixel.

Thus, if the generic pixel of the area under planning is covered by the electromagnetic field of one (or more) cell(s), that pixel will be distributed a certain fraction of offered traffic, made up of a sum of traffic contributions from each cell whose electromagnetic field is perceived at the considered pixel—possibly limitedly to the first N cells selected from the a cell list like the basic list 410, ordered by decreasing field strength, starting from the first, proportional to the probability that the cell is the first-choice serving cell in that pixel. The overall pure offered traffic offered to that pixel can thus be expressed as:

$$T_{i,j}^{off.PURE} = \sum_{k=1}^{N} T_{tot}^{off.PURE}(A_k)$$

wherein N is the number indicating the maximum number of cells considered, ordered by electromagnetic field strength, irrespective of the hierarchical layer to which they belong.

The sub-threshold probability $P_{ss}$ indicates to what extent the pixel is not reached by the services of the network, and thus provides an indication of (e.g., it is proportional to) a possible unexpressed traffic for that pixel; by unexpressed traffic there is intended that quota of traffic that could potentially be offered to the network, but that the network (in the current configuration) cannot take on due to inadequate coverage; the unexpressed traffic can be viewed as fresh traffic, that could be captured improving the coverage (outdoor or indoor).

Figure 8:
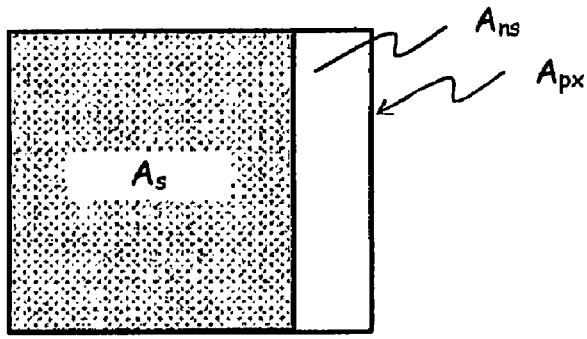
FIG. 8 is a graphic representation in terms of areas of carried traffic portions and non-carried traffic portions for a generic pixel.

Referring to FIG. 8, let it be assumed that the traffic is distributed uniformly over the whole area of the generic pixel, of area $A_{px}$, and let $A_s$ denote the fraction of the pixel area that is served by the set of N cells, whereas $A_{ns}$ is the fraction of the pixel area that is not served, not covered; the area fraction $A_{ns}$ is proportional to the sub-threshold probability $P_{ss}$, whereas the area fraction $A_s$ is proportional to $(1-P_{ss})$. $T_{i,j}^{off.PURE}$ is the overall pure traffic offered to the cells by the pixel, sum of the pure offered traffic portions that are offered to the various cells perceived on the pixel; $T_{unexpressed}$ is instead the unexpressed traffic to be estimated. The following relations exist:

$$T_{i,j}^{off.PURE} \cdot (1-P_{ss}) = T_{unexpressed} \cdot P_{ss}$$

and thus:

$$T_{unexpressed} = T_{i,j}^{off.PURE} \frac{P_{ss}}{(1-P_{ss})}$$

Calculating the unexpressed traffic for every pixel of the area under planning, a map of the unexpressed traffic is obtained.

Up to now, the pure offered traffic has been considered. However, in general the following relation holds true for a generic cell:

$$T_{tot}^{offered}(A_k) = T_{tot}^{off.PURE}(A_k) + T_{tot}^{off.OVF}(A_k)$$

where the pure offered traffic $T_{tot}^{off.PURE}$ is the traffic directly offered to the cell, whereas $T_{tot}^{off.PURE}$ is an overflow traffic that is captured by the cell, and which is the sum of traffic quota lost by other cells.

In the network planning phase only the pure offered traffic should be distributed, because the overflow traffic depends on the network configuration and varies according to it. On the contrary, since as mentioned in the foregoing the offered traffic is calculated starting from measures of the carried traffic, it includes not only the pure traffic, but also the overflow traffic (in other words, it is the total offered traffic offered to the cell).

According to an embodiment of the present invention, before distributing the offered traffic across the various pixels, the total offered traffic calculated starting from the measured carried traffic is depurated of the overflow traffic, i.e. of the quotas of traffic that are lost by other cells.

Merely for simplicity of calculations, it is assumed that the traffic lost by a generic cell that is a first-choice serving cell may fall onto cells that are second-choice serving cells (in other words, possible quota of traffic that may fall from the first-choice serving cell onto the third-choice, fourth-choice, etc. serving cells are for simplicity neglected, as well as any traffic portion that may overflow from the second-choice serving cell to the third-choice serving cell, and so on).

When, for the generic pixel $px_{ij}$, a cell $A_k$ among the N cells considered after filtering is the most probable serving cell, each one of the remaining N−1 cells has a certain probability of being second-choice serving cell, and this probability depends on the respective average electromagnetic field, and on the hierarchic relationships among the cells. Thus, each one of the remaining N−1 cells is a candidate for taking up a respective portion of the traffic possibly lost by the best server cell $A_k$. Part of the lost traffic is in general irremediably lost, depending on the sub-threshold probability of the second-choice serving cell, i.e. of the probability that none of the remaining cells can serve the considered pixel in case the best (first-choke) server is congestioned.

For each pixel, a number N*(N−1) of second-choice serving cell probabilities are to be calculated, (N−1) probabilities for each cell taken as most probable serving cell; furthermore, the sub-threshold probability of the second-choice serving cell has to be calculated.

The traffic lost by a generic cell $A_k$ for a pixel $px_{i,j}$, when the cell is the most probable serving cell, is calculated as follows:

$$T_{i,j}^{lost}(A_k) = T_{tot}^{lost}(A_k) \frac{P_{i,j}(A_k) \cdot \tau_{i,j}}{\sum_{(i,j) \in A_k} P_{i,j}(A_k) \cdot \tau_{i,j}}$$

Let $A_1, A_2, \ldots, A_N$ denote the N cells for the pixel $px_{ij}$; the traffic possibly lost by the cell $A_k$ may overflow and fall onto the remaining (N−1) cells, in a way proportional to the respective probabilities of being the second-choice serving cells with respect to the cell $A_k$, and to the probability that the considered second-choice serving cell is congestioned:

$$T_{i,j}^{overflow}(A_k \to A_m) = P_{i,j}(A_m^{II} \backslash A_k^I) \cdot [1-P_B(A_m)] \cdot T_{i,j}^{lost}(A_k) \quad \forall m=1,2,\ldots,N, m \neq k$$

wherein $A_m$ is the generic second-choice serving cell, $P_{i,j}(A_m^{II} \backslash A_k^I)$ is the probability that the cell $A_m$ is second-choice serving cell for the first-choice serving cell $A_k$, and $P_B(A_m)$ is the probability that the second-choice serving cell is in turn congestioned.

It is also possible to evaluate, for the generic cell $A_m$, the sum of the traffic contributes received as overflow traffic from the other (N−1) cells for the generic pixel:

$$T_{i,j}^{overflow}(A_m) = \sum_{k=1, \neq m}^{N} T_{i,j}^{overflow}(A_k \to A_m)$$

The overall traffic that the cell $A_m$ receives as overflow traffic is the sum of the overflow traffic contributes for all the pixels:

$$T_{tot}^{overflow}(A_m) = \sum_{(i,j) \in I_{A_m}} T_{i,j}^{overflow}(A_m)$$

wherein $I_{A_m}$ is the set of the pixels whereat the cell $A_m$ has non-zero probability of being the best server.

The pure offered traffic offered to the cell $A_m$ is thus:

$$T_{tot}^{off.PURE}(A_m) = T_{tot}^{offered}(A_m) - T_{tot}^{overflow}(A_m)$$

Once the pure offered traffic has been calculated for each cell, the traffic distribution can be performed, in the way previously described, i.e. based on the traffic generation propensities of the pixels, and based on the probability that the cell is the best serving cell for the pixels. In case a non-zero sub-threshold probability exists for the cell $A_k$ on the generic pixel $p_{i,j}$, a part of the traffic is lost:

$$T_{i,j}^{overflow}(\text{lost}) = \left(1 - \sum_{\substack{k \\ k \neq m}}^{N_1} \{P_{i,j}(A_m^{II} \setminus A_k^I) \cdot (1 - P_B(A_m))\}\right) \cdot T_{i,j}^{lost}(A_k)$$

As mentioned in the foregoing in connection with FIG. 2, after having examined the traffic distribution, the network designer may decide to modify the current network configuration, for example introducing new network sites (i.e., new radio base stations), modifying the equipment of already existing radio base stations, eliminating radio base stations, and the like. In general, any change to the previous network configuration changes the cells that cover the generic pixel, and/or the average electromagnetic field levels (estimated by the simulator) change. As a consequence, the numbers describing the probabilities of the cells to be first-choice serving cells (or second-choice serving cells, third-choice serving cells, and so on) on a generic pixel change, and are to be recalculated.

Based on the newly determined value of the sub-threshold probability, the new unexpressed traffic is calculated, and the network designer can see whether the new network configuration allows capturing at least a part of the previously unexpressed traffic, or the unexpressed traffic has increased.

In other words, after the traffic distribution, and in case of changes in the network configuration, the probabilities of the various cells to be serving cells (first-order, second-order, and so on) in the various pixels need to be recalculated, because these values are in general subjected to change, at least in those network areas that are affected by network configuration changes. The changes may for example concern only the first-choice serving cell probability values for the different cells of the (unaltered) set of N cells covering a certain pixel, or the set of N cells covering a generic pixel may vary, in that one or more cells may disappear from the set, and other cells enter. For this reason, it is necessary to recalculate all the probabilities of the cells of being serving cells, for all the pixels of the area under planning.

Then, the network designer evaluates the entity of traffic portions that have been captured, or conversely dismissed, by each cell in the generic pixel, depending on the change in the probability of the cell to be the serving cell for that pixel. For example, if, after the network configuration change, a certain cell is perceived in a pixel with an increased electromagnetic field level, the cell's probability of being the serving cell for that pixel increases compared to those of the other cells, that instead decrease (indeed, the sum of the probabilities for the considered pixel has to be equal to 1); thus, that cell gains traffic compared to the previous network configuration, and such a gained traffic is drained from those offered to the other cells, whose serving cell probabilities have decreased.

The network designer also evaluates whether at least part of the potential unexpressed traffic in each pixel can be captured thanks to a decrease of the sub-threshold probability. If the sub-threshold probability decreases compared to the previous situation, part of the potentially unexpressed traffic can be offered to the network as fresh traffic, and thus the cells that have increased their serving cell probabilities can capture portions of the fresh traffic. If on the contrary the sub-threshold probability increases, because the coverage worsens, part of the overall traffic of the pixel (sum of the various contributes from the different cells) is lost.

In other words, following a change in the network configuration a generic cell can in general increase its traffic, by (i) capturing traffic from the unexpressed traffic (and then the sub-threshold probability decreases), and/or (ii) draining traffic from other cells whose serving cell probability decreases; or the cell can decrease its traffic, by (iii) dismissing part of it in favor of other cells due to a decrease in the probability of being the serving cell, and/or (iv) loosing part of the traffic due to a worsening in the pixel coverage (increase of the sub-threshold probability).

The fresh offerable traffic is given by the following formula:

$$T_{i,j}^{fresh} = T_{i,j}^{unexpr,potential} \cdot \left(\frac{P_{SS}^{NEW}(i,j) - P_{SS}^{OLD}(i,j)}{P_{SS}^{OLD}(i,j)}\right)$$

This fresh traffic is acquired by the cells which increase their serving cell probability proportionally to the normalized improvements:

$$T_{i,j}^{fresh}(A_m) = \frac{P_{i,j}^{new}(A_m) - P_{i,j}^{old}(A_m)}{\sum_{A_k \in J} [P_{i,j}^{new}(A_k) - P_{i,j}^{old}(A_k)]} \cdot T_{i,j}^{fresh}$$

(alternatively, the fresh traffic may be assigned only to the new cells introduced by the network configuration change).

Similarly, the traffic possibly lost in a pixel due to a worsening in the coverage (increase in the sub-threshold probability) is expressed as:

$$T_{i,j}^{lost} = T_{i,j}^{offPureTOT} \cdot \left(\frac{P_{SS}^{OLD}(i,j) - P_{SS}^{NEW}(i,j)}{P_{SS}^{OLD}(i,j)}\right)$$

The lost traffic, if any, is proportional to the pure traffic offered to the pixel (sum of the contributes of the pure offered traffics of the various cells covering the pixel). This corresponds to a decrease of the pure offered contributes of the cells whose probability of being the serving cell decreases, proportionally to the normalized worsening:

$$T_{i,j}^{lost}(A_k) = \frac{P_{i,j}^{old}(A_k) - P_{i,j}^{new}(A_k)}{P_{i,j}^{old}(A_k)} \cdot T_{i,j}^{lost}.$$

The traffic drained by a cell whose probability of being the first-choice serving cell increases can be calculated by preliminary calculating the traffic surrendered by the cells whose best server probability decreases; the contribute of the generic cell $A_k$ to the surrendered traffic is:

$$T_{i,j}^{surrendered}(A_k) = \frac{P_{i,j}^{old}(A_k) - P_{i,j}^{new}(A_k)}{P_{i,j}^{old}(A_k)} \cdot T_{i,j}^{off.PURE}(A_k)$$

whereas the overall surrendered traffic on a certain pixel is:

$$T_{i,j}^{ceased} = \sum_k T_{i,j}^{ceased}(A_k)$$

for each cell for which the probability of being the serving cell has decreased.

The traffic drained by the generic cell $A_m$ from the other cells thanks to the improvement in its probability of being the serving cell is:

$$T_{i,j}^{drained}(A_m) = \frac{P_{i,j}^{new}(A_m) - P_{i,j}^{old}(A_m)}{\sum_W [P_{i,j}^{new}(A_w) - P_{i,j}^{old}(A_w)]} \cdot T_{i,j}^{surrendered}$$

where the summation in the denominator is done over the set W of cells which have increased their probability of being the serving cell (with the exception of the cell $A_m$), and represents a normalization factor.

In general, the traffic gathered by a cell on one of the pixels thereof can be written as:

$$T_{i,j}^{off.PURE\ New}(A_k) = T_{i,j}^{off.PURE\ Old}(A_k) + T_{i,j}^{drained}(A_k) + T_{i,j}^{fresh}(A_k)$$

in case the cell's probability of being the serving cell increases, and $$T_{i,j}^{off.PURE\ New}(A_m) = T_{i,j}^{off.PURE\ Old}(A_m) - T_{i,j}^{surrendered}(A_m) - T_{i,j}^{lost}(A_m)$$

in case the cell's probability of being the serving cell decreases (again, in an alternative embodiment the fresh traffic may be assigned only to the newly introduced cells).

The contribute $T_{i,j}^{fresco}(A_k)$ of the fresh traffic in the first equation may be zero if the sub-threshold probability does not decrease, as well as the contribute $T_{i,j}^{perso}(A_m)$ second equation may be zero in case the sub-threshold probability does not increase.

After the designer has found a satisfactory network configuration, the traffic distributed across the various pixels of the area under planning has to be re-aggregated, so as to obtain amounts of pure offered traffic for each cell.

According to an embodiment of the present invention, the re-aggregation is made taking into account for each pixel the probabilities of the cells of being first-choice server for that pixel. In particular, the pure offered traffic for the generic cell $A_m$ can be calculated as follows:

$$T_{tot}^{offered}(A_m) =$$

$$T_{tot}^{off.PURE}(A_m) + \sum_{i,j \in I_{A_m}} \sum_{k \in W_{i,j}} P_{i,j}(A_m^{ll} \backslash A_k^{l}) \cdot (1 - P_B(A_m)) \cdot T_{i,j}^{lost}(A_k).$$

wherein $I_{A_m}$ is the set of pixels at which the cell $A_m$ has a non-zero probability of being first-choice server, $W_{i,j}$ is the set of cells whose signal is received in the pixel $p_{ij}$, that is W={k: $A_k$ is received in the pixel $p_{ij}$ and k≠m}.

Figure 9:
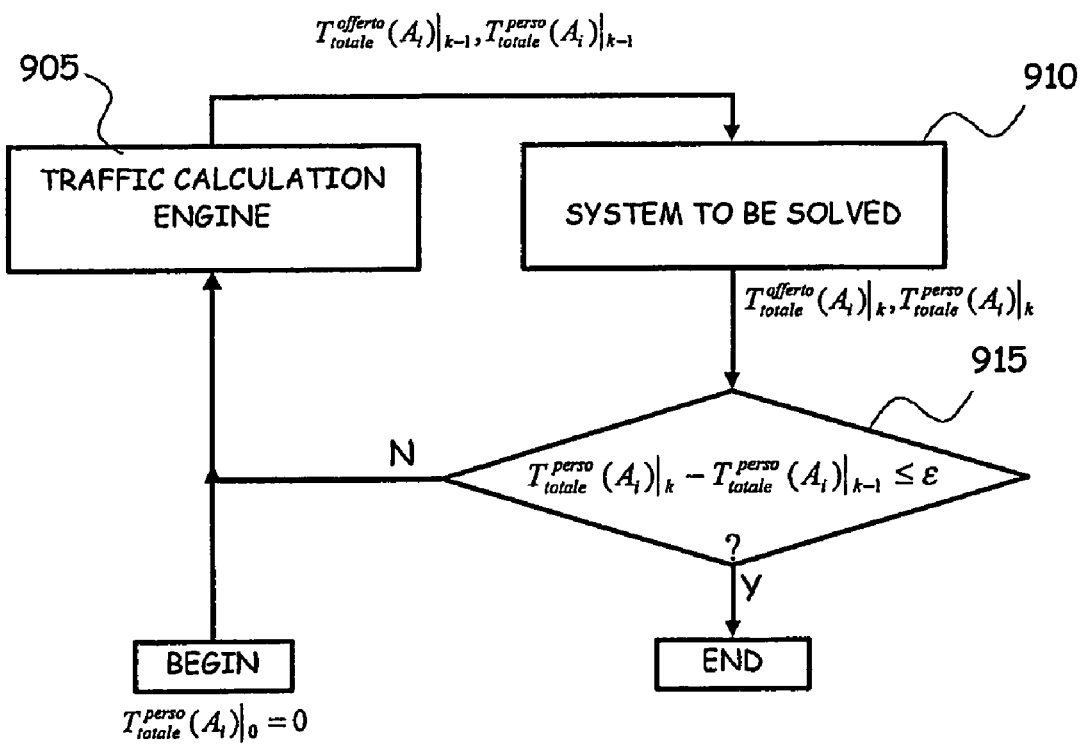
FIG. 9 is a schematic flowchart of an iterative algorithm for re-aggregating traffic after distribution.

The above relation represents a system wherein the variables are the overall offered traffic and the lost traffic. The system can be solved iteratively, as depicted schematically in FIG. 9: starting with the assumption that the traffic offered to the cells is just the pure traffic, the carried traffics and the lost traffic (if any) by each cell are calculated (block 905), using known algorithms like the one described in the cited document WO 02/080602. Then, the lost traffic is distributed over the server area of each cell, which is determined based on the probabilities of the cell to be serving cell. The lost traffic contributes $T_{i,j}^{perso}(A_k)$ generate overflow traffic contributes on the cells of the pixel different from the cell being the most probable, i.e. first-choice serving cell, which contributes can be calculated based on the probability of each cell of being second-choice serving cell with respect of the first-choice serving cell. For each cell it is then possible to add up the overflow traffic contributes evaluated for all the pixels thereof, thereby obtaining a cell overall overflow traffic, to be added to the pure offered traffic, and an overall offered traffic is obtained (block 810). The overall offered traffic forms the basis for the calculation of the new carried traffic and lost traffic, by means of known algorithms like the one described in the above cited application. The iterative process ends when the lost traffic calculated at the k-th step is equal to that calculated at the (K-1)-th step, less a predetermined small quantity (decision block 815).

Thanks to the described method, it is possible to achieve a distribution of the offered traffic which is very true to reality; and thus provides a rather reliable basis for evaluating whether an existing network configuration is suitable or needs to be changed, so as to be able to serve more traffic and improve the quality of the service perceived by the users.

Figure 10:
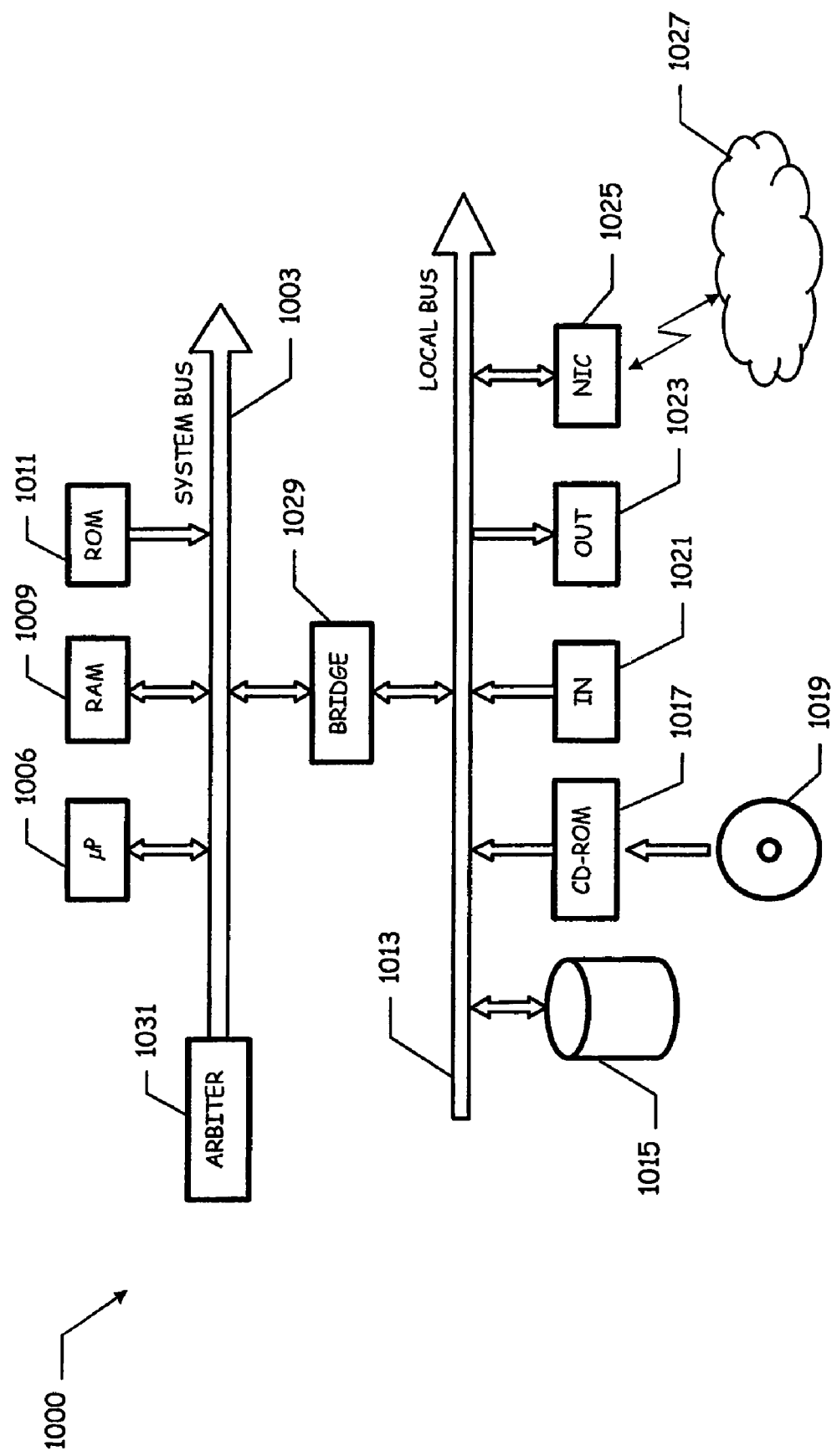
FIG. 10 schematically shows the main functional components of a data processing apparatus that, suitably programmed, is adapted to carry out the method according to an embodiment of the invention.

The above described method may in particular be carried out by a suitably programmed data processing apparatus or system like a personal computer or a workstation; the structure of a general-purpose computer 1000 is schematically depicted in FIG. 10.

The computer 1000 is comprised of several units that are connected in parallel to a system bus 1003. In detail, one (possibly more) processor (μp) 1006 controls the operation of the computer 1000; a RAM 1009 is directly used as a working memory by the microprocessor 1006, and a ROM 1011 stores the basic code for a bootstrap of the computer 1000. Peripheral units are connected (by means of respective interfaces) to a local bus 1013. Particularly, mass storage devices comprise a hard disk 1015 and a CD-ROM/DVD-ROM drive 1017 for reading CD-ROMs/DVD-ROMs 1019. Moreover, the computer 1000 typically includes input devices 1021, for example a keyboard and a mouse; and output devices 1023, such as a display device (monitor) and a printer. A Network Interface Card (NIC) 1025 is used to connect the computer 1000 to a network 1027, e.g. a LAN. A bridge unit 1029 interfaces the system bus 1003 with the local bus 1013. Each microprocessor 1006 and the bridge unit 1029 can operate as master agents requesting an access to the system bus 1003 for transmitting information; an arbiter 1031 manages the granting of the access to the system bus 1003.

Figure 11:
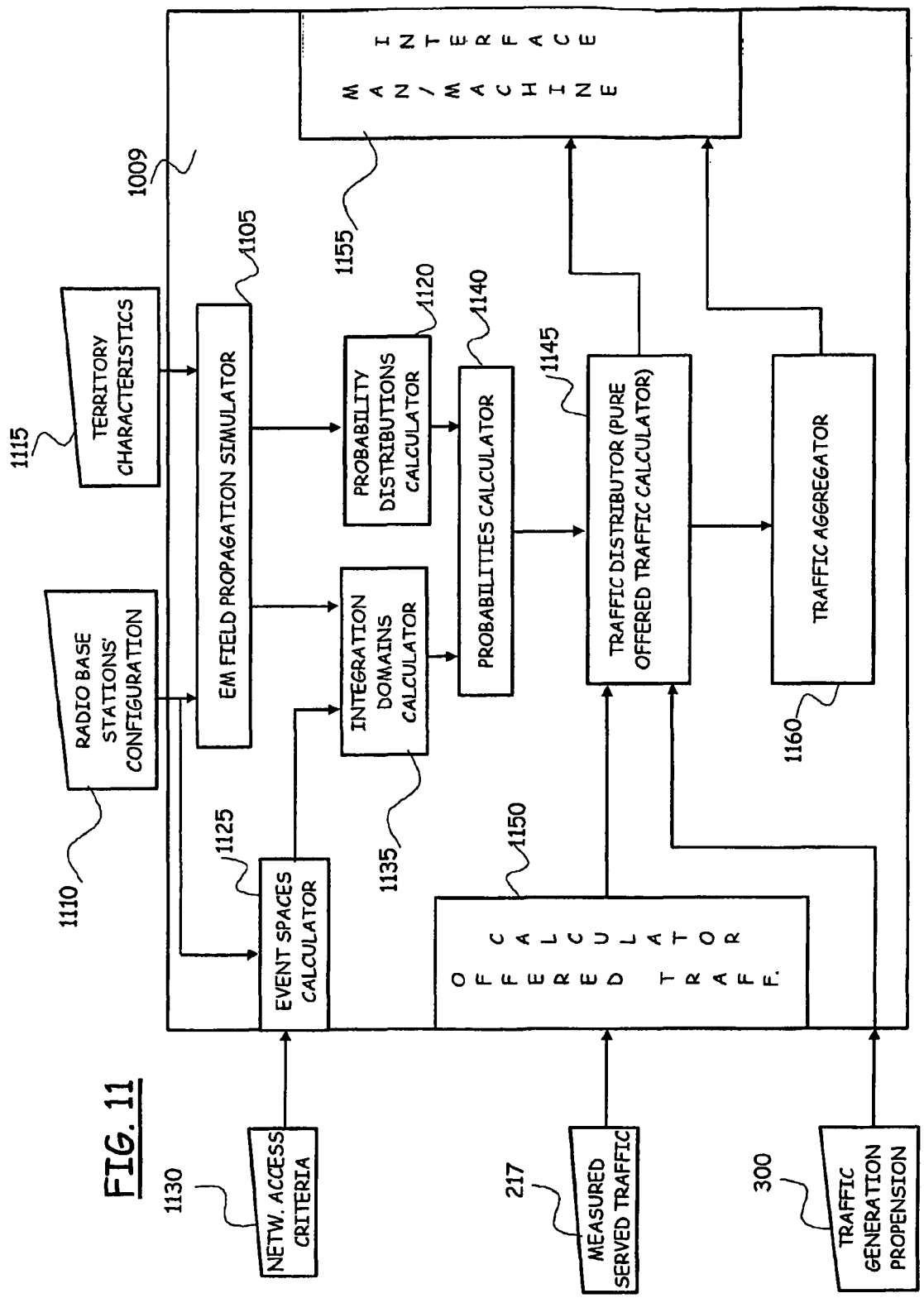
FIG. 11 schematically shows the main components of a program, when executed on the data processing apparatus of FIG. 10, implementing the method according to an embodiment of the present invention.

In FIG. 11, computer program components adapted to implement the above-described method are schematically shown, according to an embodiment of the invention. In particular, FIG. 11 schematically depicts a partial content of the working memory 1009 of the computer of FIG. 10. The information (programs and data) is typically stored on the hard disk and loaded (at least partially) into the working memory when the program is executed. The programs may be initially installed onto the hard disk from, e.g., CD-ROMs or DVD-ROMs, or they may be downloaded from, e.g., a distribution server machine through the data communications network 1027.

An electromagnetic field propagation simulator module 1105 calculates the average electromagnetic field levels of the various cells and in the various pixels of the area of interest, given a configuration 1110 of the radio base stations (radio base stations locations and radio equipment) and the characteristics 1115 of the territory in the area of interest 100, which are inputs to the program.

A probabilistic distribution calculator module 1120 calculates the probability (e.g., Gaussian) distributions of the electromagnetic fields of the various cells in the various pixels, based on a predetermined model that takes into account some or all of the above discussed effects (as well as other possible effects).

An event spaces calculator module 1125 calculates for each cell and for each pixel a space of events for which that cell is the serving cell for that pixel; the event spaces are for example based on predetermined network access criteria 1130. The event spaces calculator module 1125 may also calculate events spaces for determining the probabilities of the cells to be second-choice serving cell, third-choice serving cell, etc.

The event domains are used by an integration domains calculator module 1135 for calculating integration domains for the integration of the probability distributions.

A probabilities calculator module 1140 uses the integration domains thus calculated to integrate the probability distributions and obtain the probabilities that the cells are serving cells in the various pixels (in a similar way the probabilities of the cells to be second-choice serving cell, third-choice serving cell, etc are calculated).

A traffic distributor module 1145 distributes an offered traffic, calculated from the measured carried traffic 217 by an offered traffic calculator module 1150, based on the traffic generation propension 300 and the calculated serving cell probabilities.

A man/machine interface module 1155, e.g. a graphical user interface, allows displaying the results of the traffic distribution process to the operator.

A traffic aggregator module 1160 re-aggregates the distributed traffic.

It is observed that at least some of the modules described above may take the form of different, independent software programs.

The present invention has been disclosed by means of some exemplary embodiments thereof, however those skilled in the art, in order to satisfy contingent needs, will readily devise modifications to the described embodiment, as well as alternative embodiments, without for this reason departing from the protection scope defined in the appended claims.

In particular, the use of the new radio coverage estimation method according to the present invention is not limited to the traffic distribution estimation of a network planning process: it may be exploited in many other applications, for example in order to let a network designer evaluate the better positioning of the radio base stations.

Also, although in the described embodiments the case of a GSM network has been considered, this is not to be construed as a limitation to the present invention, which is more generally applicable to different types of radio communications networks, like for example CDMA-based networks such as UMTS networks, networks based on the IEEE 802.11 standard, shortly referred to as WiFi networks, WiMax networks, super 3G networks, 4G networks, irrespective of the specific type of the adopted radio access technique, or even on mixed radio access technologies (e.g., GSM and UMTS), with the possibility of exchange of traffic portions from one access technology to the other. Regardless of the specific radio access technology, the method can be implemented by dividing an area of interest into area elements, estimating (by means of suitable electromagnetic field distribution simulators) the (e.g., average) electromagnetic field in the various area elements corresponding to a certain network configuration, deriving statistical, probability distributions for the electromagnetic field in each area elements, taking for example into account possible errors or deviations of a really perceived field level compared to the estimated average field. Then, based for example on the specific network access procedure that is implemented in the specific network for regulating access to the network by the mobile terminals, events are determined that establish when a certain cell of the network is in charge of serving users located in a certain area element. Based on such events, areas of integration of the probability distributions are determined: integrating the probability distributions over such integration areas gives the probability that a certain cell is the serving cell for a certain area element. As mentioned in the foregoing, this methodology allows determining the probability that a cell is not only the best (first-choice) serving cell, but also the second-choice, third-choice, etc. serving cell for a considered area element.

The invention claimed is:

1. A method for estimating coverage of a selected geographic area by a cellular radio mobile communications network comprising a plurality of radio base stations, comprising:
   dividing the selected area into a plurality of area elements;
   determining expected serving radio base stations in said plurality of radio base stations expected to serve the area elements, based on an estimation of the strength of the radio electromagnetic field of the radio base stations in the area elements, said determining expected serving base radio stations comprising:
   estimating for each radio base station of said plurality of radio base stations, a respective probabilistic distribution of the strength of the radio electromagnetic fields irradiated b the radio base station and perceived in each area element of said plurality of area elements; and
   calculating for each radio base station of said plurality of radio base stations and for each area element of said plurality of area elements, respective probabilities that the radio base station serves said plurality of area elements, based on said estimated probabilistic distributions,
   wherein:
   estimation of the strength of the radio electromagnetic field is determined by simulating a radio electromagnetic wave propagation from the radio base stations in said geographic area and calculating an average electromagnetic field strength in each area element;
   said estimating the probabilistic distributions comprises:
   associating with the electromagnetic field strength a probabilistic distribution with average value and variance depending on said average electromagnetic field strength and at least one effect selected from the group of: an intrinsic wave propagation simulation error, a field fading error, an indoor field attenuation, and a body loss attenuation; and
   determining respective probability density functions; and
   said calculating the probabilities comprises:
   determining exhaustive sets of events for which the radio base stations act as serving stations for the considered area element, based on a predetermined network access criterion implemented by the network for assigning a serving cell to a mobile terminal;

deriving from said sets of events respective integration domains for integrating the probability density functions; and integrating the probability density functions over said integration domains.

2. The method of claim 1, wherein the cellular radio mobile communications network comprises at least a first and a second radio access layers, wherein said determining exhaustive sets of events comprises taking into account a priority of radio base stations of the first radio access layers over radio base stations of the second radio access layer provided for in said predetermined network access criterion implemented by the network for assigning a serving cell to a mobile terminal.

3. The method of claim 1, further comprising:

for the generic area element of said plurality of area elements, calculating a respective degree of coverage by the communications network as a sum of said probabilities that the radio base stations of said plurality serve said area element.

4. A method for estimating coverage of a selected geographic area by a cellular radio mobile communications network comprising a plurality of radio base stations, comprising:

dividing the selected area into a plurality of area elements;

determining expected serving radio base stations in said plurality of radio base stations expected to serve the area elements, based on an estimation of the strength of the radio electromagnetic field of the radio base stations in the area elements, said determining expected serving base radio stations comprising:

estimating for each radio base station of said plurality of radio base stations, a respective probabilistic distribution of the strength of the radio electromagnetic fields irradiated by the radio base station and perceived in each area element of said plurality of area elements; and calculating for each radio base station of said plurality of radio base stations and for each area element of said plurality of area elements, respective probabilities that the radio base station serves said plurality of area elements, based on said estimated probabilistic distributions, wherein:

estimation of the strength of the radio electromagnetic field is determined by simulating a radio electromagnetic wave propagation from the radio base stations in said geographic area and calculating an average electromagnetic field strength in each area element; and said estimating the probabilistic distributions of the strength of the radio electromagnetic fields irradiated by the radio base stations and perceived in each area element, comprises: estimating, for each radio base station, an outdoor probabilistic distribution without taking into account the indoor field attenuation and an indoor probabilistic distribution taking into account the indoor field attenuation; and said calculating, for each area element, the probabilities that the radio base stations serve the area element comprises:

calculating, for each radio base station, an outdoor probability and an indoor probability, respectively based on the respective outdoor probabilistic distribution and indoor probabilistic distribution:

associating with each area element a respective indoor degree factor, based on a density of buildings in said area element; and combining, for each radio base station, the outdoor probability and the indoor probability using said indoor degree factor.

5. A non-transitory computer-readable medium tangibly storing a computer program comprising instructions, when executed, causing a hardware data processing system to carry out the steps of the method according to claim 1.

6. A non-transitory computer-readable medium tangibly storing a computer program comprising instructions, when executed, causing a hardware data processing system to carry out the steps of the method according to claim 4.

\* \* \* \* \*